United States Patent
Hirai et al.

(10) Patent No.: US 12,053,997 B2
(45) Date of Patent: Aug. 6, 2024

(54) THERMOSENSITIVE RECORDING MEDIUM

(71) Applicant: Nippon Paper Industries Co., Ltd., Tokyo (JP)

(72) Inventors: Kenji Hirai, Tokyo (JP); Yoshimi Midorikawa, Tokyo (JP); Yuka Murata, Tokyo (JP); Kentaro Kawasaki, Tokyo (JP)

(73) Assignee: Nippon Paper Industries Co., Ltd. (JP)

( * ) Notice: Subject to any disclaimer, the term of this patent is extended or adjusted under 35 U.S.C. 154(b) by 232 days.

(21) Appl. No.: 17/784,584

(22) PCT Filed: Dec. 8, 2020

(86) PCT No.: PCT/JP2020/045602
§ 371 (c)(1),
(2) Date: Jun. 10, 2022

(87) PCT Pub. No.: WO2021/117702
PCT Pub. Date: Jun. 17, 2021

(65) Prior Publication Data
US 2023/0027721 A1    Jan. 26, 2023

(30) Foreign Application Priority Data

Dec. 12, 2019   (JP) .................................. 2019-224166
Mar. 2, 2020    (JP) .................................. 2020-034863
Mar. 3, 2020    (JP) .................................. 2020-035845
Mar. 6, 2020    (JP) .................................. 2020-038886

(51) Int. Cl.
| | |
|---|---|
| *B41M 5/44* | (2006.01) |
| *B41M 5/333* | (2006.01) |
| *B41M 5/337* | (2006.01) |
| *C08F 2/26* | (2006.01) |
| *C08F 265/06* | (2006.01) |

(52) U.S. Cl.
CPC .......... *B41M 5/443* (2013.01); *B41M 5/3333* (2013.01); *B41M 5/3372* (2013.01); *B41M 5/44* (2013.01); *C08F 2/26* (2013.01); *C08F 265/06* (2013.01); *B41M 2205/04* (2013.01); *B41M 2205/40* (2013.01)

(58) Field of Classification Search
CPC .. B41M 5/3333; B41M 5/337; B41M 5/3372; B41M 5/42; B41M 5/44; B41M 5/443; B41M 2205/04; B41M 2205/40; C08F 2/26; C08F 265/06
See application file for complete search history.

(56) References Cited

U.S. PATENT DOCUMENTS

| | | | |
|---|---|---|---|
| 5,208,208 A | 5/1993 | Motoda et al. | |
| 5,677,365 A * | 10/1997 | Kikuta | C08F 265/06 523/201 |

FOREIGN PATENT DOCUMENTS

| | | |
|---|---|---|
| JP | H05-000574 A | 1/1993 |
| JP | H05-00574 U | 1/1993 |
| JP | H08-59603 A | 3/1996 |
| JP | 2000-238432 A | 9/2000 |
| JP | 2002-301873 | 10/2002 |
| JP | 2003-154760 A | 5/2003 |
| JP | 2008-73858 A | 4/2008 |
| JP | 2010-89497 A | 4/2010 |
| JP | 2014-188725 A | 10/2014 |
| JP | 2015-13470 A | 1/2015 |
| JP | 2015-080852 A | 4/2015 |
| WO | WO 97/16420 A1 | 5/1997 |
| WO | WO 02/081229 A1 | 10/2002 |
| WO | WO 2010/110209 A1 | 9/2012 |
| WO | WO 2019/044462 | 3/2020 |

OTHER PUBLICATIONS

International Search Report correspondong to International Application No. PCT/JP2020/045602 dated Mar. 2, 2021.
International Preliminary Report on Patentability corresponding to International Application No. PCT/JP2020/045602 dated May 17, 2022.
Written Opinion of the International Searching Authority corresponding to International Application No. PCT/JP2020/045602 dated Mar. 2, 2021.
Supplementary European Search Report issued in the corresponding European Patent Application No. 20900008.2; dated Dec. 23, 2022 (total 5 pages).

* cited by examiner

*Primary Examiner* — Gerard Higgins
(74) *Attorney, Agent, or Firm* — Harness, Dickey & Pierce, P.L.C.

(57) ABSTRACT

Provided is a thermosensitive recording medium having a sufficient water resistance to moisture and humidity, such as for outdoor use in rainy weather and the like, and also having a superior color developing sensitivity, print image quality when printing at high speed, ink fixability and solvent resistance and the like. As the protective layer comprises a specific silane-modified acrylic resin which is an aqueous emulsion of core-shell type p articles, in a thermosensitive recording medium having a thermosensitive recording layer on a substrate and a protective layer on the thermosensitive recording layer, the thermosensitive re cording medium has a sufficient water resistance and also has a superior color developing sensitivity, print image quality when printing at high speed, ink fixability and solvent resistance and the like.

20 Claims, No Drawings

THERMOSENSITIVE RECORDING MEDIUM

FIELD OF THE INVENTION

The present invention relates to a thermosensitive recording medium having a superior water resistance, color developing sensitivity, print image quality when printing at high speed, ink fixability and solvent resistance and the like.

BACKGROUND OF THE INVENTION

A thermosensitive recording medium is obtained by grinding a colorless or pale colored basic leuco dye (henceforth referred to as "dye") and an electron accepting color developing agent (henceforth referred to as "color developing agent") each into fine particles, preparing dispersions, blending the dispersions, preparing a coating solution by adding a binder, a filler, a sensitivity improving agent, a lubricant and other aids and applying the coating solution on a support material such as paper, synthetic paper, film, plastic and the like. The color is developed instantaneously through a chemical reaction when heated using a thermal head, hot stamp, thermal pen, laser beam and the like to yield a recorded image. It is generally known to install a protective layer on the thermosensitive recording layer to improve the storage stability of a thermosensitive re cording medium.

It is known to prevent the head wear during printing or to improve the storage stability of print image and the water resistance of a thermosensitive recording medium by incorporating a silane-modified acrylic resin in the thermosensitive recording layer or the protective layer (References 1, 2 etc.).

It is also known that a thermosensitive recording medium shows a sufficient water resistance and the like, by having the protective layer contain an acrylic resin with a glass transition temperature of higher than 50 degree C. and lower than or equal to 95 degree C. (Reference 3 etc.).

In recent years, the use of the thermosensitive recording medium is expanding to various applications, such as various ticket, receipts, labels, ATM of Bank, meter reading of gas and electricity, cash vouchers, such as car racing or horseracing betting. Then thermosensitive recording medium has been required to have various performances such as a superior water resistance, a plasticizer resistance of the image part, a heat resistance of the blank part, an oil resistance, and a storage stability of the image part and the blank part under severe environment.

In response to such demands, a thermosensitive recording medium in which water resistance, plasticizer resistance of the image part, heat resistance of the blank part etc. are improved by using a combination of two specific types of color developing agents (Reference 4), and a urea compound as a color developing agent for improving the required performances such as color density, whiteness, and storage stability of the printed parts of a thermosensitive recording medium (Reference 5) are disclosed.

REFERENCES

Reference 1: Japanese Patent Application Public Disclosure H5-574
Reference 2: Japanese Patent Application Public Disclosure 2000-238432
Reference 3: International Publication WO2010/110209
Reference 4: Japanese Patent Application Public Disclosure 2015-80852
Reference 5: International Publication WO2019/044462

Problems to be Solved by the Invention

Therefore, the object of the present invention is to provide a thermosensitive recording medium having a sufficient water resistance to moisture and humidity, such as for outdoor use in rainy weather and the like, and also having a superior color developing sensitivity, print image quality when printing at high speed, ink fixability and solvent resistance and the like.

Means to Solve the Problems

As a result of intensive studies, the present inventors have found that the thermosensitive recording medium has a sufficient water resistance and also has a superior color developing sensitivity, print image quality when printing at high speed, ink fixability and solvent resistance and the like by having the protective layer contain a specific silane-modified acrylic resin which is an aqueous emulsion of core-shell type particles, and then completed the present invention.

That is, the present invention provides a thermosensitive recording medium having a thermosensitive recording layer comprising a colorless or pale colored electron donating leuco dye and an electron accepting color developing agent on a substrate and a protective layer on the thermosensitive recording layer, wherein the protective layer comprises a silane-modified acrylic resin and the silane-modified acrylic resin is an aqueous emulsion of core-shell type particles, wherein the core-shell type particle comprises (i) a core comprising copolymer A prepared by polymerizing the following (a1), (a2) and (a3) in the presence of (b), and (ii) a shell comprising copolymer B prepared by polymerizing the following (a1) and (a2) in the presence of (b).

(a1) at least one (meth)acrylic acid ester
(a2) a monomer having an alkoxysilyl group and an ethylenic double bond
(a3) a monomer having a carboxyl group and an ethylenic double bond
(b) a polymerizable surfactant comprising a sulfate having an allyl group and a polyoxyethylene chain.

Advantages of the Present Invention

According to the present invention, it is possible to provide a thermosensitive recording medium having a sufficient water resistance to moisture and humidity, such as for outdoor use in rainy weather and the like, and also having a superior color developing sensitivity, print image quality when printing at high speed, ink fixability and solvent resistance and the like.

DETAILED DESCRIPTION OF THE INVENTION

In the thermosensitive recording medium of the present invention, the protective layer installed on the thermosensitive recording layer comprises a silane-modified acrylic resin. And the silane-modified acrylic resin used in the present invention is an aqueous resin emulsion obtained by multi-step emulsion polymerization of plural types of polymerizable unsaturated monomers in the presence of a surfactant.

The silane-modified acrylic resin is an aqueous emulsion of core-shell type particles, wherein the core-shell type particle comprises (i) a core comprising copolymer A obtained by polymerizing the following (a1), (a2) and (a3) components in the presence of (b) component, and (ii) a shell comprising copolymer B obtained by polymerizing the following (a1) and (a2) components in the presence of (b) component.

(a1): at least one type of (meth)acrylic acid ester (a2): a monomer having an alkoxysilyl group and an ethylenic double bond (a3): a monomer having a carboxyl group and an ethylenic double bond (b): a polymerizable surfactant comprising a sulfate having an allyl group and a polyoxyethylene chain.

The copolymer A may be prepared by adding a styrene monomer to the (a1), (a2) and (a3) components and polymerizing these in the presence of (b) component, and/or the copolymer B may be prepared by adding a styrene monomer to the (a1) and (a2) components and polymerizing these in the presence of (b) component.

<(a1) at Least One (meth)acrylic Acid Ester>

In the present specification, "(meth)acrylic acid" means both acrylic acid and methacrylic acid, and also means including at least one of acrylic acid and methacrylic acid.

"(Meta) acrylic acid ester" means an ester of (meth) acrylic acid, that is, (meth)acrylate. (Meth)acrylate indicates both acrylate and methacrylate, and also means containing at least one of acrylate and methacrylate.

It is noted that "(meth)acrylate" does not include vinyl esters having a structure in which a vinyl group and oxygen are bonded, such as vinyl acetate, in the present specification.

Specific examples of (meth)acrylate include (meta) acrylic acid alkyl esters such as methyl(meth)acrylate, ethyl(meth)acrylate, propyl(meth)acrylate, isopropyl(meth)acrylate, butyl(meth)acrylate, 2-ethylhexyl(meth)acrylate, pentyl(meth)acrylate, hexyl(meth)acrylate, cyclohexyl(meth)acrylate, octyl (meth)acrylate, decyl(meth)acrylate, dodecyl(meth)acrylate, tridecyl(meth) acrylate, octadecyl(meth)acrylate, behenyl(meth)acrylate, docosyl(meth)acrylate, etc.; (meta) acrylic acid hydroxy alkyl ester such as 2-hydroxyethyl(meth)acrylate, 2-hydroxybutyl(meth)acrylate, 2-hydroxypropyl(meth)acrylate, etc. and the like.

These may be used individually or as a mixture of at least two of them.

In the embodiment of the present invention, the (meth) acrylic acid ester is preferably (meth)acrylic acid alkyl ester, and is specifically methyl methacrylate (MMA), 2-ethylhexyl acrylate (2EHA), n-butyl acrylate (n-BA), n-butyl methacrylate (n-BMA), cyclohexyl methacrylate (CHMA) and the like, but the (meth)acrylic acid ester is not limited to these.

<(a2) a Monomer Having an Alkoxysilyl Group and an Ethylenic Double Bond>

The monomer having an alkoxysilyl group and an ethylenic double bond refers to a compound capable of imparting an alkoxysilyl group to an aqueous resin emulsion resin obtained by an emulsion polymerization reaction, and is not particularly limited as long as the aqueous resin emulsion of the present invention can be obtained.

The monomer having an alkoxysilyl group and an ethylenic double bond has both an alkoxysilyl group and an ethylenic double bond, and the alkoxysilyl group and the ethylenic double bond may be bonded, for example, through ester bond, amide bond, alkylene or the like.

The "alkoxysilyl group" refers to a silicon-containing functional group that brings a hydroxyl group (Si—OH) by hydrolysis, which binds to silicon. The "alkoxysilyl group" includes, for example, trimethoxysilyl group, triethoxysilyl group, dimethoxysilyl group, dimethoxymethylsilyl group, diethoxysilyl group, monoethoxysilyl group and monomethoxysilyl group, etc. In particular, trimethoxysilyl group and triethoxysilyl group are preferable.

As used herein, the term "ethylenic double bond" refers to a carbon atom-to-carbon double bond that can undergo a polymerization reaction (for example, radical polymerization). Examples of the functional group having such an ethylenic double bond include vinyl group ($CH_2$=CH—), (meth)allyl group ($CH_2$=CH—$CH_2$— and $CH_2$=C($CH_3$)—$CH_2$—), (meta) acryloyloxy group ($CH_2$=CH—COO— and $CH_2$=C($CH_3$)—COO—), (meth)acryloyloxyalkyl group ($CH_2$=CH—COO—R— and $CH_2$=C($CH_3$)—COO— R—) and —COO—CH=CH—COO— and the like.

It is noted that the monomer having an alkoxysilyl group and an ethylenic double bond is not included in the category of the above-mentioned (meth)acrylic acid ester.

It is possible to exemplify, as the monomer having an alkoxysilyl group and an ethylenic double bond, a compound represented by the following formula (1):

$$R^1Si(OR^2)(OR^3)(OR^4) \qquad (1)$$

wherein, in the formula (1), $R^1$ is a functional group having an ethylenic double bond, $R^2$, $R^3$ and $R^4$ are an alkyl group having 1 to 5 carbon atoms, and $R^2$, $R^3$ and $R^4$ may be the same or different from each other.

Examples of the functional group having an ethylenic double bond for $R^1$ include vinyl group, (meth)allyl group, (meth)acryloyloxy group, 2-(meth)acryloyloxyethyl group, 2-(meth)acryloyloxypropyl group, 3-(meth)acryloyloxypropyl group, 2-(meth)acryloyloxybutyl group, 3-(meth)acryloyloxybutyl group and 4-(meth)acryloyloxybutyl.

Examples of the alkyl group having 1 to 5 carbon atoms for $R^2$, $R^3$ and $R^4$ include linear or branched alkyl groups such as methyl group, ethyl group, n-propyl group, isopropyl group, n-butyl group, isobutyl group, sec-butyl group, t-butyl group, n-pentyl group and the like. Examples of the "monomer having an alkoxysilyl group and an ethylenic double bond" include vinyltrialkoxysilanes such as vinyltrimethoxysilane, vinyltriethoxysilane and vinyltri-n-butoxysilane.

Specifically, 3-(meth)acryloyloxypropyltrimethoxysilane and 3-(meth)acryloyloxypropyltriethoxysilane are preferable, and 3-(meth)acryloyloxypropyltrimethoxysilane is particularly preferable.

These monomers having an alkoxysilyl group and an ethylenic double bond can be used alone or in combination.

<(a3) a Monomer Having a Carboxyl Group and an Ethylenic Double Bond>

Examples of a monomer having a carboxyl group include (meth)acrylic acid. As mentioned above, (meth)acrylic acid means both acrylic acid and methacrylic acid. It is particularly preferable to use acrylic acid as the (meth)acrylic acid.

The "ethylene double bond" is as described above.

<(b) a Polymerizable Surfactant Comprising a Sulfate Having an Allyl Group and a Polyoxyethylene Chain>

Examples of the sulfate having an allyl group and a polyoxyethylene chain include a sulfate ester ammonium salt having an allyl group and a polyoxyethylene chain, a sulfate ester sodium salt having an allyl group and a polyoxyethylene chain, and a sulfate ester potassium salt having an allyl group and a polyoxyethylene chain. Specifically, it is possible to exemplify: a polyoxyethylene-1-(allyloxymethyl)alkyl ether sulfate ester ammonium salt, a polyoxyethylene-1-(allyloxymethyl)alkyl ether sulfate ester sodium salt, a polyoxyethylene-1-(allyloxymethybalkyl ether sulfate ester potassium salt; an α-[1-[(allyloxy)methyl]-2-(nonylphenoxy)ethyl]-ω-polyoxyethylenesulfate ester ammonium salt, an α-[1-[(allyloxy)methyl]-2-(nonylphenoxy)ethyl]-ω-polyoxyethylenesulfate ester sodium salt, an α-[1-

[(allyloxy)methyl]-2-(nonylphenoxy)ethyl]-ω-polyoxyethylenesulfate ester potassium salt; and the like. These sulfate may be used alone or in combination.

The sulfate having an allyl group and a polyoxyethylene chain according to the present invention is preferably a ammonium sulfate, namely, a polyoxyethylene-1-(allyloxymethyl)alkyl ether sulfate ester ammonium salt and an α-[1-[(allyloxy)methyl]-2-(nonylphenoxy)ethyl]-ω-polyoxyethylenesulfate ester ammonium salt are preferable, and especially a polyoxyethylene-1-(allyloxymethyl)alkyl ether sulfate ester ammonium salt is most preferable.

Examples of commercially available products of the sulfate having an allyl group and a polyoxyethylene chain include "AQUALON KH-10 (trade name)": polyoxyethylene chain length of 10) and "AQUALON KH-1025 (trade name)": 25% aqueous solution of AQUALON KH-10) manufactured by Dai-ichi Kogyo Seiyaku Co., Ltd. as the polyoxyethylene-1-(allyloxymethyl)alkyl ether sulfate ester ammonium salt; and "Adecaria Soap SR-1025 (trade name)" manufactured by Asahi Denka Co., Ltd. as the α-[1-[(allyloxy)methyl]-2-(nonylphenoxy)ethyl]-ω-polyoxyethylenesulfate ester ammonium salt.

In the embodiment of the present invention, as long as the objective aqueous resin emulsion can be obtainable, the polymerizable unsaturated monomer may include "other monomers". Other monomers mean monomers other than the (meth)acrylic acid ester, the monomer having an alkoxysilyl group and an ethylenic double bond, and the monomer having a carboxyl group.

Examples of "other monomers" include, but are not limited to: styrene-based monomers such as styrene and styrenesulfonic acid; and acrylamides such as (meth)acrylamide and diacetone(meth)acrylamide.

<Multi-Step Emulsion Polymerization>

The silane-modified acrylic resin (i.e. aqueous resin emulsion) according to the present invention is obtainable by multi-step emulsification polymerization of a polymerizable unsaturated monomer in the presence of a surfactant.

In an embodiment of the present description, the polymerizable unsaturated monomers undergo emulsification polymerization in a plurality of steps (substantially two steps).

The polymerizable unsaturated monomers (above mentioned a1, a2, a3 and b) used at the polymerization other than the final step is referred to as the polymerizable unsaturated monomer A, and thus obtained polymer is referred to as the copolymer A. And the polymerizable unsaturated monomers (above mentioned a1, a2 and b) used at the final step of the polymerization is referred to as the polymerizable unsaturated monomer B, and thus obtained polymer is referred to as the copolymer B.

The aqueous resin emulsion finally obtained by multi-step emulsion polymerization can be obtained by polymerizing the polymerizable unsaturated monomer B with the pre-emulsion obtained by polymerization of the polymerizable unsaturated monomer A.

The aqueous resin emulsion obtained by the multi-step emulsion polymerization has a multi-layer structure (i.e. core shell).

In the present invention, the polymerizable unsaturated monomer used for the multi-step emulsion polymerization includes a polymerizable unsaturated monomer A used in a step other than the final step and a polymerizable unsaturated monomer B used in the final step. The weight ratio of the polymerizable unsaturated monomer B to the polymerizable unsaturated monomer A (polymerizable unsaturated monomer B/polymerizable unsaturated monomer A) is preferably 30/70 to 70/30, particularly preferably 40/60 to 60/40.

When the weight ratio of (the polymerizable unsaturated monomer B to the polymerizable unsaturated monomer A is within the above ratio, the aqueous resin composition (i.e. aqueous resin emulsion) according to the present invention is excellent in balance between coatability and durability (water resistance, alcohol resistance, ester-based solvent resistance and plasticizer resistance).

The ratio of the a2 polymerizable unsaturated monomer is preferably 0.05 to 1.0 weight %, more preferably 0.4 to 0.8 weight %, and the ratio of the a3 polymerizable unsaturated monomer is preferably 0.5 to 10 weight %, more preferably 2.0 to 6.0 weight %, of the combined weight of the polymerizable unsaturated monomers of a1, a2 and a3 in the copolymer A. While the balance is a1 polymerizable unsaturated monomer, the ratio of the a1 polymerizable unsaturated monomer of the combined weight of the above a1, a2, and a3 polymerizable unsaturated monomers is preferably 89 to 99 weight %, more preferably 90 to 98 weight %.

The ratio of the a2 polymerizable unsaturated monomer is preferably 0.01 to 1.0 weight %, more preferably 0.1 to 0.4 weight % of the combined weight of the polymerizable unsaturated monomers of a1 and a2 in the copolymer B. While the balance is a1 polymerizable unsaturated monomer, the ratio of the a1 polymerizable unsaturated monomer of the combined weight of the above a1 and a2 polymerizable unsaturated monomers is preferably 85 to 99.9 weight %, more preferably 95 to 99.9 weight %.

In addition, in the synthesis of copolymers A and B (i.e., silane-modified acrylic resin), the ratio of the total amount of (b) a polymerizable surfactant comprising a sulfate having an allyl group and a polyoxyethylene chain in the synthesis process is preferably 0.5 to 5 weight % of the combined weight of the polymerizable unsaturated monomers of a1, a2 and a3 in the copolymer A.

The silane-modified acrylic resin (i.e. aqueous resin emulsion) of the present invention is available, for example, from Henkel Japan Ltd. under the trade name of AQUENCE EPIX BC 21066.

One example of the multistep emulsion polymerization process is described below:

First, a mixture of polymerizable unsaturated monomer A is prepared from (a1) (meth)acrylic acid ester, (a2) a monomer having an alkoxysilyl group and an ethylenic double bond and (a3) a monomer having a carboxyl group in a rection vessel such as a flask.

Water (or an aqueous medium) is added to a sulfate having an allyl group and a polyoxyethylene chain to obtain an aqueous solution. Then the mixture of the polymerizable unsaturated monomer A is added to this aqueous solution to prepare a monomer emulsion A.

Separately from the monomer emulsion A, a monomer emulsion B is prepared in another vessel. The monomer emulsion B can be prepared using the same method as the above-mentioned method for preparing the monomer emulsion A. Specifically, a mixture of the polymerizable unsaturated monomer B is prepared by mixing (a1) (meth)acrylic acid ester, (a2) a monomer having an alkoxysilyl group and an ethylenic double bond uniformly.

The mixture of the polymerizable unsaturated monomer B is added to the aqueous solution of a sulfate having an allyl group and a polyoxyethylene chain to obtain monomer emulsion B.

Next, water and (b) a sulfate having an allyl group and a polyoxyethylene chain are charged in a reaction vessel equipped with a stirrer, a thermometer and the like, and a part of the monomer emulsion A and a catalyst are added. While maintaining the temperature in the vessel at a suitable temperature, the remainder of the monomer emulsion A and the catalyst are further added dropwise to prepare a pre-emulsion.

By adding the monomer emulsion B and the catalyst dropwise to the pre-emulsion, followed by polymerization, the aqueous resin emulsion, which is a final product, is synthesized by multi-step emulsion polymerization.

Examples of the "catalyst" used in this reaction include ammonium persulfate, sodium persulfate, potassium persulfate, t-butyl peroxybenzoate, 2,2-azobisisobutinitrile (AIBN) and 2,2-azobis(2-amidinopropane) dihydrochloride and 2,2-azobis(2,4-dimethylvaleronitrile) and the like, and ammonium p ersulfate, sodium persulfate and potassium persulfate are particularly preferable.

The glass transition point (Tg) of the silane-modified acrylic resin used in the present invention is preferably −10 degree C. or higher and 50 degree C. or lower, more preferably 0 degree C. or higher and 50 degree C. or lower. Tg of the copolymer A is preferably lower than Tg of the copolymer B. Tg of the copolymer A is preferably −20 to 20 degree C., more preferably −10 to 20 degree C., and particularly preferably −10 to 15 degree C. Tg of the copolymer B is preferably 10 to 50 degree C., more preferably 25 to 50 degree C., and particularly preferably 30 to 50 degree C. The minimum film forming temperature (MFT) of the silane-modified acrylic resin used in the present invention is preferably 25 degree C. or lower.

The Tg and MFT of the silane-modified acrylic resin are measured by differential scanning calorimetry (DSC).

The protective layer of the present invention contains a binder (including the above-mentioned silane-modified acrylic resin), preferably contains a pigment, and may contain other optional components.

The combined amount of the binder and the pigment in the protective layer is, in terms of solid content, usually from 80 to 100 weight %, preferably from 90 to 100 weight %. The amount of the binder is preferably about from 30 to 300 parts by weight per 100 parts by weight of the pigment.

The amount of the silane-modified acrylic resin in the protective layer is preferably from 10 to 70 weight %, more preferably from 30 to 60 weight %.

Each amount of the other components in the protective layer is not more than 15 weight %, preferably not more than 10 weight %.

The protective layer of the present invention may further contain a high Tg acrylic resin as a binder. When the protective layer of the present invention contains the high Tg acrylic resin, the vinyl chloride sticking resistance and the ink fixability are improved.

The high Tg acrylic resin is a non-core shell type acrylic resin, and its glass transition point (Tg) is higher than 50 degree C. and lower than or equal to 95 degree C. The Tg is measured by differential scanning calorimetry (DSC).

The high Tg acrylic resin contains (meth)acrylic acid and a monomer that can be copolymerized with (meth)acrylic acid. The amount of (meth)acrylic acid is preferably from 1 to 10 parts by weight per 100 parts by weight of non-core shell type acrylic resin. The (meth)acrylic acid is soluble in alkali and has a characteristic activity of converting the non-core shell type acrylic resin to a water soluble resin by adding a neutralizer. By converting the non-core shell type acrylic resin to a water soluble resin, the affinity to pigments becomes improved, when a protective layer contains pigments, which makes the protective layer have a superior strength even in the presence of large amount of pigments.

The monomer element that can be copolymerized with (meth)acrylic acid includes, for example, alkyl acrylic acid resin, such as methyl(meth)acrylate, ethyl(meth)acrylate, propyl(meth)acrylate, iso-butyl(meth)acrylate, pentyl(meth) acrylate, hexyl (meth)acrylate, 2-ethyl hexyl(meth)acrylate, octyl(meth)acrylate and the like, modified alkyl acrylic acid resin, such as alkyl acrylic acid resin as above that is modified with epoxy resin, silicone resin, styrene or these derivatives, (meth)acrylonitrile, acrylic ester and hydroxy-alkyl acrylic ester. Among these, (meth)acrylonitrile and/or methyl (meth)acrylate are preferred. The amount of (meth) acrylonitrile in the non-core shell type acrylic resin is preferably from 15 to 70 parts by weight per 100 parts by weight of the non-core shell type acrylic resin and the amount of methyl(meth)acrylate in the non-core shell type acrylic resin is preferably from 20 to 80 parts by weight per 100 parts by weight of the non-core shell type acrylic resin.

The content of the high Tg acrylic resin in the protective layer of the present invention is preferably from 5 to 50 weight %, more preferably from 10 to 40 weight %.

When the protective layer of the present invention contains the high Tg acrylic resin, the content of the silane-modified acrylic resin in the protective layer is, in terms of solid content (the same applies hereinafter), preferably from 5 to 50 weight %, more preferably from 10 to 40 weight %.

The various materials used in the present invention are shown below. These materials, such as binders, crosslinking agents, pigments and the like, may be used not only for the protective layer, bur also for the other coating layer(s) such as the thermosensitive recording layer and the coating layer prepared as needed, unless the desired effects for the problems described above are not hampered.

As the other binder used in the present invention, polyvinyl alcohols, such as completely saponified polyvinyl alcohol, partially saponified polyvinyl alcohol, modified polyvinyl alcohols such as acetoacetylated polyvinyl alcohol, carboxyl-modified polyvinyl alcohol, amide-modified polyvinyl alcohol, sulfonic acid-modified polyvinyl alcohol, butyral-modified polyvinyl alcohol, olefin-modified polyvinyl alcohol, nitrile-modified polyvinyl alcohol, pyrolidone-modified polyvinyl alcohol, silicone-modified polyvinyl alcohol, other modified polyvinyl alcohol and the like; acrylic resins (excluding above-mentioned acrylic resins) comprising (meth)acrylic acid and a monomer (excluding olefins) that can be copolymerized with (meth)acrylic acid; cellulose derivatives, such as hydroxyethyl cellulose, methyl cellulose, ethyl cellulose, carboxymethyl cellulose, acetyl cellulose and the like; starches, such as oxidized starch, etherified starch, esterified starch and the like; styrene-maleic anhydride copolymer, styrene-butadiene copolymer, casein, gum Arabic, polyvinyl chloride, polyvinyl acetate, polyacrylamide, polyacrylic acid ester, polyvinyl butylal, polystyrol and their copolymers, silicone resins, petroleum resins, terpene resins, ketone resins, cumaron resins and the like may be listed as examples. The polymeric substances may be used upon dissolving them in a solvent such as water, alcohol, ketones, esters, hydrocarbons and the like or upon emulsifying or dispersing into a paste in water or other media. These polymeric materials may also be used in combinations according to the qualities demanded.

The cross-linking agent that can be used in the present invention include zirconium compounds, such as zirconium chloride, zirconium sulfate, zirconium nitrate, zirconium acetate, zirconium carbonate, zirconium stearate, zirconium octylate, zirconium silicate, zirconium oxynitrate, potassium carbonate, ammonium carbonate and the like; multivalent aldehyde compounds, such as glyoxal, glutaraldehyde, aldehyde starch and the like; carbodiimide compounds, such as dicyclohexylcarbodiimide, diisopropylcarbodiimide, 1-ethyl-3-(3-dimethylaminopropyl) carbodiimide and the like; methylol melamine, melamine formaldehyde resin, melamine urea resin, polyamine epichlorohydrin resin, polyamide epichlorohydrin resin, potassium p ersulfate, ammonium p ersulfate, sodium persulfate, ferric chloride, magnesium chloride, borax, boric acid, alum, ammonium chloride and the like.

In the present invention, it is preferable to use a carbodiimide compound as a cross-linking agent for the thermosensitive recording layer and the protective layer since particularly high water resistance can be obtained. Specific examples of the carbodiimide compound include, for example, trade names: Carbodilite SV-02, V-02, V-02-L2, V-04, E-01, E-02 manufactured by Nisshinbo Chemical Inc. and the like.

As the pigment used in the present invention, inorganic or organic fillers and the like such as kaolin, calcined kaolin, aluminum hydroxide, silica, calcium carbonate, diatomaceous earth, talc, titanium oxide, and the like may be cited. As the pigment used in the protective layer, kaolin, calcined kaolin and aluminum hydroxide are preferred.

The aspect ratio of the pigment is preferably 30 or more. By adding such a pigment, it is possible to compensate for the drawbacks of the acrylic resin with high Tg, such as plasticizer resistance and solvent resistance. Further the addition of pigments also has the effect of improving stick resistance.

As the slipping agent used in the present invention, fatty acid metal salts such as zinc stearate, calcium stearate and the like, wax, silicone resins and the like may be cited. As stabilizers in the present invention that impart oil resistance and the like to recorded images, 4,4'-butylidene (6-t-butyl-3-methylphenol), 2,2'-di-t-butyl-5,5'-dimethyl-4,4'-sulfonyl diphenol, 1,1,3-tris(2-methyl-4-hydroxy-5-cyclohexylphenyl) butane, 1,1,3-tris(2-methyl-4-hydroxy-5-t-butylphenyl) butane, 4-benzyloxy-4'-(2,3-epoxy-2-methylpropoxy)diphenylsulfone and the like may be used. In addition, UV absorption agents, such as benzophenone type and triazole type UV absorption agents dispersion agents, defoaming agents, oxidation inhibitors, fluorescent dye and the like may also be used.

The thermosensitive recording layer of the present invention comprises a colorless or pale colored electron donating leuco dye and an electron accepting color developing agent, and may further comprise a sensitizer, the above-mentioned binder, cross-linking agent, lubricant, pigment, and various other components.

All of the leuco dyes well known in the conventional field of pressure sensitive and thermosensitive recording media may be used as the electron donating leuco dye in the present invention. Although the leuco dye is not particularly restricted, triphenylmethane type compounds, fluorane type compounds, fluorene type compounds, divinyl type compounds and the like are preferred as the leuco dye. Specific examples of the typical colorless to pale colored basic colorless leuco dye (leuco dye precursors) are shown below. In addition, these leuco dye precursors may be used individually and also in mixtures of at least two of them.

<Triphenylmethane Type Leuco Dyes>

3,3-bis(p-Dimethyl aminophenyl)-6-dimethylaminophthalide [alternate name: crystal violet lactone] and 3,3-bis (p-Dimethyl aminophenyl) phthalide [alternate name: malachite green lactone]

<Fluorane Type Leuco Dyes>

3-Diethylamino-6-methylfluorane, 3-diethylamino-6-methyl-7-anilinofluorane, 3-diethylamino-6-methyl-7-(o,p-dimethylanilino)fluorane, 3-diethylamino-6-methyl-7-chlorofluoran, 3-diethylamino-6-methyl-7-(m-trifluoromethylanilino) fluorane, 3-diethylamino-6-methyl-7-(o-chloroanilino) fluorane, 3-diethylamino-6-methyl-7-(p-chloroanilino) fluorane, 3-diethylamino-6-methyl-7-(o-fluoroanilino) fluorane, 3-diethylamino-6-methyl-7-(m-methylanilino) fluorane, 3-diethylamino-6-methyl-7-n-octylanilino fluorane, 3-diethylamino-6-methyl-7-n-octylamino fluorane, 3-diethylamino-6-methyl-7-benzylamino fluorane, 3-diethylamino-6-methyl-7-dibenzylamino fluorane, 3-diethylamino-6-chloro-7-methyl fluorane, 3-diethylamino-6-chloro-7-anilino fluorane, 3-diethylamino-6-chloro-7-p-methylanilino fluorane, 3-diethylamino-6-ethoxyethyl-7-anilino fluorane, 3-diethylamino-7-methyl fluorane, 3-diethylamino-7-chloro fluorane, 3-diethylamino-7-(m-trifluoromethylanilino) fluorane, 3-diethylamino-7-(o-chloroanilino) fluorane, 3-diethylamino-7-(p-chloroanilino) fluorane, 3-diethylamino-7-(o-fluoroanilino) fluorane, 3-diethylamino-benz[a] fluorane, 3-diethylamino-benz[c] fluorane, 3-dibutylamino-6-methyl-fluorane, 3-dibutylamino-6-methyl-7-anilino fluorane, 3-dibutylamino-6-methyl-7-(o,p-dimethylanilino) fluorane, 3-dibutylamino-7-(o-chloroanilino) fluorane, 3-butylamino-6-methyl-7-(p-chloroanilino) fluorane, 3-dibutylamino-6-methyl-7-(o-fluoroanilino) fluorane, 3-dibutylamino-6-methyl-7-(m-fluoroanilino) fluorane, 3-dibutylamino-6-methyl-chloro fluorane, 3-dibutylamino-6-ethoxyethyl-7-anilino fluorane, 3-dibutylamino-6-chloro-7-anilino fluorane, 3-dibutylamino-6-methyl-7-p-methylanilino fluorane, 3-dibutylamino-7-(o-chloroanilino) fluorane, 3-dibutylamino-7-(o-fluoroanilino) fluorane, 3-di-n-pentylamino-6-methyl-7-anilino fluorane, 3-di-n-pentylamino-6-methyl-7-(p-chloroanilino) fluorane, 3-di-n-pentylamino-7-(m-trifluoromethylanilino) fluorane, 3-di-n-pentylamino-6-chloro-7-anilino fluorane, 3-di-n-pentylamino-7-(p-chloroanilino) fluorane, 3-pyrolidino-6-methyl-7-anilino fluorane, 3-piperidino-6-methyl-7-anilino fluorane, 3-(N-methyl-N-propylamino)-6-methyl-7-anilino fluorane, 3-(N-methyl-N-cyclohexylamino)-6-methyl-7-anilino fluorane, 3-(N-ethyl-N-cyclohexylamino)-6-methyl-7-anilino fluorane, 3-(N-ethyl-N-xylylamino)-6-methyl-7-(p-chloroanilino) fluorane, 3-(N-ethyl-p-toluidino)-6-methyl-7-anilino fluorane, 3-(N-ethyl-N-isoamylamino)-6-methyl-7-anilino fluorane, 3-(N-ethyl-N-isoamylamino)-6-chloro-7-anilino fluorane, 3-(N-ethyl-N-tetrahydrofurfurylamino)-6-methyl-7-anilino fluorane, 3-(N-ethyl-N-isobutylamino)-6-methyl-7-anilino fluorane, 3-(N-ethyl-N-ethoxypropylamino)-6-methyl-7-anilino fluorane, 3-cyclohexylamino-6-chloro fluorane, 2-(4-oxahexyl)-3-dimethylamino-6-methyl-7-anilino fluorane, 2-(4-oxahexyl)-3-diethylamino-6-methyl-7-anilino fluorane, 2-(4-oxahexyl)-3-dipropylamino-6-methyl-7-anilino fluorane, 2-methyl-6-o-(p-dimethylaminophenyl)aminoanilino fluorane, 2-methoxy-6-p-(p-dimethylaminophenyl)aminoanilino fluorane, 2-chloro-3-methyl-6-p-(p-phenylaminophenyl)aminoanilino fluorane, 2-chloro-6-p-(p-dimethylaminophenyl) aminoanilino fluorane, 2-nitro-6-p-(p-diethylaminophenyl)aminoanilino fluorane, 2-amino-6-p-(p-diethylaminophenyl) aminoanilino fluorane, 2-diethylamino-6-p-(p-diethylaminophenyl) aminoanilino fluorane, 2-phenyl-6-methyl-6-p-(p-phenylaminophenyl) aminoanilino fluorane, 2-benzyl-6-p-(p-phenylaminophenyl) aminoanilino fluorane, 2-hydroxy-6-p-(p-phenylaminophenyl)aminoanilino fluorane, 3-methyl-6-p-(p-dimethylaminophenyl)aminoanilino fluorane, 3-diethylamino-6-p-(p-diethylaminophenyl)

aminoanilino fluorane, 3-diethylamino-6-p-(p-dibutylaminophenyl) aminoanilino fluorane and 2,4-dimethyl-6-[(4-dimethylamino) anilino] fluorane.

<Fluorene Type Leuco Dye>

3,6,6-Tris(dimethylamino)spiro[fluorane-9,3'-phthalide] and 3,6,6'-tris (diethylamino)spiro[fluorane-9,3'-phthalide].

<Divinyl Type Leuco Dyes>

3,3-bis-[2-(p-dimethylaminophenyl)-2-(p-methoxyphenyl) ethenyl]-4,5,6,7-tetrabromophthalide, 3,3-bis-[2-(p-dimethylaminophenyl)-2-(p-methoxyphenyl) ethenyl]-4,5,6,7-tetrachlorophthalide, 3,3-bis-[1,1-bis(4-pyrrolidinophenyl)ethylene-2-yl]4,5,6,7-tetrabromophthalide, 3,3-bis-[1-(4-methoxyphenyl)-1-(4-pyrrolidinophenyl) ethylene-2-yl]-4,5,6,7-tetrachlorophthalide <Others>

3-(4-Diethylamino-2-ethoxyphenyl)-3-(1-ethyl-2-methylindol-3-yl)-4-azaplhthalide, 3-(4-diethylamino-2-ethoxyphenyl)-3-(1-octyl-2-methylindol-3-yl)-4-azaphthalide, 3-(4-cyclohexyl ethylamino-2-methoxyphenyl)-3-(1-ethyl-2-methylindol-3-yl)-4-azaphthalide, 3,3-bis(1-ethyl-2-methylindol-3-yl)phthalide, 3,6-bis(diethylamino)fluorane-γ-(3'-nitroanilinolactam, 3,6-bis(diethylamino)fluorane-γ-(4'-nitro) anilinolactam, 1,1-bis-[2',2',2",2" ?-tetrakis-(p-dimethylaminophenyl)-ethenyl]-2,2-dinitrilethane, 1,1-bis-[2',2',2",2"-tetrakis-(p-dimethylaminophenyl)-ethenyl]-2-naplhthoylethane, 1,1-bis-[2',2',2",2" ?-tetrakis-(p-dimethylaminophenyl)-ethenyl]-2,2-diacetylethane and bis-[2,2,2',2'-tetrakis-(p-dimethylaminophenyl)-ethenyl]-methylmalonic acid dimethyl ester.

All of the color development agents well known in the conventional field of pressure sensitive and thermosensitive recording media may be used as the color development agent in a thermosensitive recording material of the present invention. Although the dye is not particularly restricted, activated clay, attapulgite, colloidal silica, inorganic acidic substances such as aluminum silicate and the like, 4,4'-isopropylidene diphenol, 1,1-bis(4-hydroxyphenyl)cyclohexane, 2,2-bis(4-hydroxyphenyl)-4-methylpentane, 4,4'-dihydroxydiphenyl sulfide, hydroquinone monobenzyl ether, benzyl 4-hydroxybenzoate, 4,4'-dihydroxy diphenyl sulfone, 2,4'-dihydroxy diphenyl sulfone, 4-hydroxy-4'-isopropxy diphenyl sulfone, 4-hydroxy-4'-n-propoxy diphenyl sulfone, bis(3-allyl-4-hydroxyphenyl) sulfone, 4-hydroxy-4'-methyl diphenyl sulfone, 4-hydroxyphenyl-4'-benzyloxyphenyl sulfone, 3,4-dihydroxyphenyl-4'-methyl phenyl sulfone, 1-[4-(4-hydroxyphenylsulfonyl) phenoxy]-4-[4-(4-isopropoxyphenylsulfonyl) phenoxy] butane, phenol condensation composition described in Japanese Patent Application Public Disclosure No. 2003-154760, aminobenzene sulfonamide derivatives described in Japanese Patent Application Public Disclosure No. H08-59603, bis(4-hydroxyphenyl thioethoxy) methane, 1,5-di(4-hydroxyphenyl thio)-3-oxapentane, butyl bis(p-hydroxyphenyl)acetate, methyl bis(p-hydroxyphenyl)acetate, 1,1-bis(4-hydroxyphenyl)-1-phenyl ethane, 1,4-bis[α-methyl-α-(4'-hydroxyphenyl)ethyl] benzene, 1,3-bis[α-methyl-α-(4'-hydroxyphenyl)ethyl] benzene, di(4-hydroxy-3-methylphenyl) sulfide, 2,2'-thiobis(3-tert-octylphenol), 2,2'-thiobis(4-tert-octylphenol), phenolic compounds such as diphenyl sulfone crosslinked compounds and the like described in International Publication WO97/16420, N-[2-(3-phenylureido)phenyl]benzenesulfonamide, phenolic compounds described in International Publication WO02/081229 or Japanese Patent Application Public Disclosure No. 2002-301873, thiourea compounds such as N,N'-di-m-chlorophenyl thiourea and the like, p-chlorobenzoic acid, stearyl gallate, bis[zinc 4-octyloxy carbonylamino] salicylate dihydrate, 4-[2-(p-methoxyphenoxy)ethyloxy] salicylic acid, 4-[3-(p-trisulfonyl) propyloxy]salicylic acid, aromatic carboxylic acids such as 5-[p-(2-p-methoxyphenoxyethoxy) cumyl]salicylic acid and salts of these aromatic carboxylic acids and polyvalent metals such as zinc, magnesium, aluminum, calcium, titanium, manganese, tin, nickel and the like, and, furthermore, antipirin complexes of zinc thiocyanate and complex zinc salts and the like of terephthal aldehyde acid with other aromatic carboxylic acids, for example, may be cited. These color development agents may be used individually and in mixtures of at least two. 1-[4-(4-hydroxyphenylsulfonyl) phenoxy]-4-[4-(4-isopropoxyphenylsulfonyl) phenoxy] butane, is available, for example, under the trade name of TOMILAC214 manufactured by Mitsubishi Chemical Corporation. The phenol condensation composition described in Japanese Patent Application Public Disclosure No. 2003-154760 is available, for example, under the trade name of TOMILAC224 manufactured by Mitsubishi Chemical Corporation. The diphenylsulfone crosslinked type compound described in International Publication WO97/16420 is available under the trade name of D-90 produced by Nippon Soda Co., Ltd. The compound described in International Publication WO02/081229 is also available under the trade names of NKK-395 and D-100 produced by Nippon Soda Co., Ltd.

As the color developing agent used in the present invention, the urea-based compound represented by the general formula 1 may be used. When using the urea compound, another color developing agent may be used in combination. In the present invention, oil resistance and heat resistance can be further improved, when using the urea compound as a color developing agent.

[Formula 1]

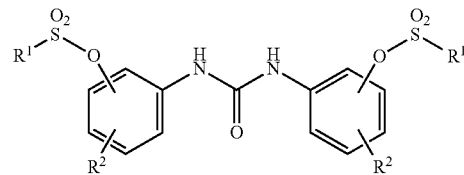

In the above general formula 1, $R^1$ represents an alkyl group, an aralkyl group or an aryl group, all of which may be substituted or unsubstituted. The alkyl group is, for example, a linear, branched or alicyclic alkyl group, preferably having 1 to 12 carbon atoms. The carbon number of the aralkyl group is preferably 7 to 12, and the carbon number of the aryl group is preferably 6 to 12. When these are substituted, the substituent is preferably an alkyl group having 1 to 12 carbon atoms, an alkoxy group having 1 to 12 carbon atoms, an aryl group having 6 to 12 carbon atoms or a halogen atom. Further, the plurality of $R^1$ may be the same or different.

The position of $R^1$—$SO_2$—O— in the benzene ring in the general formula 1 may be the same or different, and is preferably the 3-position, 4-position or 5-position.

The alkyl group includes methyl group, ethyl group, n-propyl group, iso-propyl group, n-butyl group, iso-butyl group, t-butyl group, cyclopentyl group, hexyl group, cyclohexyl group, 2-ethylhexyl group, a lauryl group and the like.

The aralkyl group may be an unsubstituted aralkyl group or an aralkyl group substituted by alkyl group, alkoxy group, aralkyl group, aryl group or halogen atom. Examples thereof include benzyl group, 1-phenylethyl group, 2-phenylethyl group, 3-phenylpropyl group, p-methylbenzyl group, m-methylbenzyl group, m-ethylbenzyl group, p-ethylbenzyl group, p-iso-propylbenzyl group, p-t-butylbenzyl group, p-methoxybenzyl group, m-methoxybenzyl group, o-methoxybenzyl group, m, p-di-methoxybenzyl group, p-ethoxy-m-methoxybenzyl group, p-phenylmethylbenzyl group, p-cumylbenzyl group, p-phenylbenzyl group, o-phenylbenzyl group, m-phenylbenzyl group, p-tolylbenzyl group, m-tolylbenzyl group, o-tolylbenzyl group and ap-chlorobenzyl group, and the like.

The aryl group may be an unsubstituted aryl group or an aryl group substituted by alkyl group, alkoxy group, aralkyl group, aryl group or halogen atom. Examples thereof include phenyl group, p-tolyl group, m-tolyl group, o-tolyl group, 2,5-dimethylphenyl group, 2,4-dimethylphenyl group, 3,5-dimethylphenyl group, 2,3-dimethylphenyl group, 3,4-dimethylphenyl group, mesitylene group, p-ethylphenyl group, p-iso-propylphenyl group, p-t-butylphenyl group, p-methoxyphenyl group, 3,4-dimethoxyphenyl group, p-ethoxyphenyl group, p-chlorophenyl group, 1-naphthyl group, 2-naphthyl group, t-butylated naphthyl group, and the like.

$R^2$ represents a hydrogen atom or an alkyl group, preferably a hydrogen atom. The alkyl group is preferably an alkyl group having 1 to 4 carbon atoms, which is, for example, methyl group, ethyl group, propyl group, isopropyl group, butyl group, isobutyl group, sec-butyl group, t-butyl group and the like.

The position of $R^2$ in the benzene ring in the general formula 1 may be the same or different, and is preferably 3-position, 4-position, or 5-position.

The urea-based compound of the present invention is preferably the urea-based compound represented by the following general formula 2.

[Formula 2]

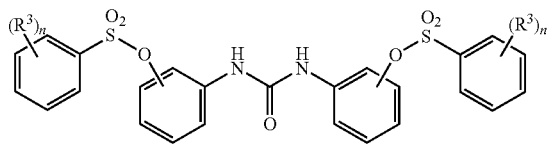

In the general formula 2, $R^3$ is alkyl group or alkoxy group, preferably alkyl group. n represents an integer of 0 to 3, preferably 0 to 2, and more preferably 0 to 1. The number of carbon atoms of the alkyl group is, for example, 1 to 12, preferably 1 to 8, and more preferably 1 to 4.

The position of $R^3$ in the benzene ring in the general formula 2 may be the same or different, and is preferably 3-position, 4-position or 5-position, more preferably 4-position.

Further, the examples of the urea-based compound used in the present invention includes, N,N'-di-[3-(benzenesulfonyloxy)phenyl]urea, N,N'-di-[3-(benzenesulfonyloxy)-4-methyl-phenyl]urea, N,N'-di-[3-(benzenesulfonyloxy)-4-ethyl-phenyl]urea, N,N'-di-[3-(benzenesulfonyloxy)-5-methyl-phenyl]urea, N,N'-di-[3-(benzenesulfonyloxy)-4-propyl-phenyl]urea, N,N'-di-[3-(o-toluenesulfonyloxy) phenyl]urea, N,N'-di-[3-(m-toluenesulfonyloxy)phenyl] urea, N,N'-di-[3-(p-toluene sulfonyloxy)phenyl]urea, N,N'-di-[3-(p-toluenesulfonyloxy)-4-methyl-phenyl]urea, N,N'-di-[3-(p-xylenesulfonyloxy)phenyl]urea, N,N'-di-[3-(m-xylenesulfonyloxy) phenyl]urea, N,N'-di-[3-(mesitylene sulfonyloxy)phenyl]urea, N,N'-di-[3-(1-nap hthalenesulfonyloxy)phenyl]urea, N,N'-di-[3-(2-naplhthalenesulfonyloxy)phenyl]urea, N,N'-di-[3-(p-ethylbenzenesulfonyloxy) phenyl]urea, N,N'-di-[3-(p-propylbenzenesulfonyloxy) phenyl]urea, N,N'-di-[3-(p-isopropylbenzenesulfonyloxy) phenyl]urea, N,N'-di-[3-(pt-butylbenzenesulfonyloxy)phenyl]urea, N,N'-di-[3-(p-methoxybenzenesulfonyloxy)phenyl]urea, N,N'-di-[3-(m-methoxybenzenesulfonyloxy)phenyl]urea, N,N'-di-[3-(o-methoxybenzenesulfonyloxy) phenyl]urea, N,N'-di-[3-(m, p-dimethoxybenzenesulfonyloxy)phenyl]urea, N,N'-di-[3-(p-ethoxybenzenesulfonyloxy) phenyl]urea, N,N'-di-[3-(p-propoxybenzenesulfonyloxy)phenyl]urea, N,N'-di-[3-(p-butoxybenzenesulfonyloxy)phenyl]urea, N,N'-di-[3-(p-cumylbenzylsulfonyloxy) phenyl]urea, N,N'-di-[3-(p-cumylbenzenesulfonyloxy)phenyl]urea, N,N'-di-[3-(o-phenylbenzenesulfonyloxy)phenyl]urea, N,N'-di-[3-(p-phenylbenzenesulfonyloxy) phenyl]urea, N,N'-di-[3-(p-chlorobenzenesulfonyloxy)phenyl]urea, N,N'-di-[4-(benzenesulfonyloxy)phenyl]urea, N,N'-di-[4-(p-toluenesulfonyloxy)phenyl]urea, N, N'-di-[3-(ethanesulfonyloxy)phenyl]urea, N,N'-di-[3-(benzylsulfonyloxy)phenyl]urea, and the like. However, the urea-based compound of the present invention is not limited to these.

The content (in solid) of the urea-based compound represented by the general formula 1 in the thermosensitive recording layer is from 1.0 to 50.0 weight %, preferably from 1.0 to 40.0 weight %.

The previously well known sensitizers may be used as the sensitizer in the thermosensitive recording medium of the present invention. As such sensitizers, aliphatic acid amides such as stearic acid amide, palmitic acid amide and the like, ethylene bis-amide, montan acid wax, polyethylene wax, 1,2-di-(3-methylphenoxy) ethane, p-benzyl biphenyl, ß-benzyloxy naphthalene, 4-biphenyl-p-tolyl ether, m-terphenyl, 1,2-diphenoxyethane, dibenzyl oxalate, di(p-chlorobenzyl) oxalate, di(p-methylbenzyl) oxalate, dibenzyl terephthalate, benzyl p-benzyloxy benzoate, di-p-tolyl carbonate, phenyl-α-naphthyl carbonate, 1,4-diethoxynaphthalene, 1-hydroxy-2-naphthoic acid phenyl ester, o-xylene-bis-(phenyl ether), 4-(m-methyl phenoxymethyl) biphenyl, 4,4'-ethylene dioxy-bis-benzoic acid dibenzyl ester, dibenzoyloxy methane, 1,2-di(3-methylphenoxy)ethylene, bis[2-(4-methoxy-phenoxy) ethyl] ether, methyl p-nitrobenzoate, phenyl p-toluene sulfonate and the like may be listed as examples. These sensitizers may be used individually and as mixtures of at least two of them.

In the present invention, it is preferable to use a sensitizer having a melting point of 90 degree C. or higher in the thermosensitive recording layer, from the viewpoint of color developing sensitivity. When the melting point of the sensitizer is lower than 90 degree C., the problems of sticks and head scraps are likely to occur. Examples of the sensitizer having a melting point of 90 degree C. or higher used in the present invention include diphenylsulfone, aliphatic acid amides such as stearic acid amide, palmitic acid amide and the like, benzyloxy naphthalene, 1,2-di(3-methylphenoxy) ethane, di(p-methylbenzyl) oxalate and the like. These sensitizers may be used individually and as mixtures of at least two of them.

The types and amounts of the leuco dye, color developing agent, sensitizer and other various ingredients used in the thermosensitive recording medium of the present invention may be determined according to the required performance and printability. Although the amounts of the color developing agent, the sensitizer, the pigment, the stabilizing agent and the other ingredients are not particularly restricted, from 0.5 parts to 10 parts of the color developing agent, from 0 parts to 10 parts, preferably from 0.5 parts to 10 parts, of the sensitizer are ordinarily used per 1 part of the leuco dye.

The thermosensitive recording layer may further comprise the silane-modified acrylic resin defined above. When both the thermosensitive recording layer and the protective layer of the present invention contain the silane-modified acrylic resin, the heat fracture resistance can be improved. The content of the silane-modified acrylic resin in the thermosensitive recording layer (in terms of solid content, the same applies hereinafter) is preferably from 3 to 50 weight %, more preferably from 5 to 30 weight %.

The dye, the color developing agent and other materials added as needed are finely ground into particles with several microns or smaller in size, using a grinder or a suitable emulsification device such as ball mills, attriters, sand grinders and the like, and a coating solution is prepared by adding a binder and various additive materials depending on the objective.

An undercoating layer may be installed between the substrate and the thermosensitive recording layer in the thermosensitive recording medium of the present invention. In addition, aback coating layer may be installed on the support medium surface opposite the surface on which is applied a thermosensitive recording layer to correct the curl. In addition, an intermediate layer may be installed between a thermosensitive recording layer and a protective layer.

The desired thermosensitive recording material can be obtained by forming the thermosensitive recording layer on a substrate, in which the substrate may be any arbitrary support such as paper, recycled paper, synthetic paper, films (which is a thin film formed from a polymer raw material), plastics, foamed plastics, non-woven fabric and the like, and forming a protective layer on the thermosensitive recording layer. Further, a composite sheet in which these are combined may be used as a support.

The examples of the film include ionomer film (IO), polyethylene film (PE), polyvinyl chloride film (PVC), polyvinylidene chloride film (PVDC), polyvinylidene fluoride film (PVDF), polyvinyl alcohol film (PVA), polypropylene film (PP), polyester film (PE), polyethylene terephthalate film (PET), polyethylene naphthalate film (PEN), polycarbonate film (PC), polystyrene film (PS), polyacrylic nitrile film (PAN), ethylene vinyl acetate copolymer film (EVA), ethylene vinylalcohol vopolymer film (EMAA), nylon film (NY), polyamide film (PA), triacetyl cellulose film (TAC), norbornene film (NB), cycloolefin film, composite film in which these films are combined and the like.

In general, when a film is used for the substrate of a thermosensitive recording medium, "whitening phenomenon" is likely to occur. This"whitening phenomenon" occurs as follows: when a large amount of water is applied or flooded on the thermosensitive recording medium, the coating layer such as the thermal recording layer and the protective layer becomes white, which causes scattering of visible light larger, then the apparent print density is lowered and the visibility of the printed image is lowered.

The "whitening phenomenon" is considered to occur in the following mechanism:

(1) When the coating layer such as the thermosensitive recording layer and the protective layer contact with water, the water-soluble components contained in these layers elute. In the case that the substrate is a film, the elution of water-soluble components in the coating layer is enhanced, since the substrate does not absorb water.

(2) Then, the coating layer shrinks as it dries, which causes the generation of fine voids in the coating layer. If the substrate is a film, the substrate does not follow the shrinkage of the coating layer, so that the stress is biased toward the coating layer and cracks are likely to occur in the coating layer.

(3) Since the fine voids and cracks in the coating layer scatter visible light, the apparent print density becomes lower and the visibility of the printed image also becomes lower, even when the printed image is not faded.

The thermosensitive recording medium of the present invention can suppress this whitening phenomenon, in which both the thermosensitive recording layer and the protective layer installed on the thermosensitive recording layer contain the above-mentioned silane-modified acrylic resin (See "water whitening resistance" in the evaluation result of Examples described later). It is considered that the elution of water-soluble components in the coating layer described above (1) is suppressed to prevent the whitening phenomenon.

In addition, when a film is used as a substrate, water resistance, breakage resistance, chemical resistance, print image quality, etc., become particularly better, since the substrate is tough, stiff and excellent in smoothness, which is suitable for the usage as labels, stickers, etc.

As the coating method for each layer, known coating methods such as blade method, air knife method, curtain method, gravure method, and roll coater method may be used.

The coating amounts of the thermosensitive recording layer, the protective layer and other coating layers prepared as necessary are not limited in particular, but may be determined according to the required performance and the recording suitability.

The typical coating amount (in solid) of the thermosensitive recording layer is about from 2 to 12 $g/m^2$ and the coating amount of the protective layer is about from 1 to 5 $g/m^2$. And the the coating amount (in solid) of the undercoat layer is about from 1 to 15 $g/m^2$.

Furthermore, various technologies known in the thermosensitive recording medium field, such as a flattening treatment such as super calendaring and the like can be applied as needed after coating individual coating layers.

EXAMPLES

The following Examples illustrate the present invention, but the Examples are not intended to limit the scope of the present invention. In the following description, the terms parts and % refer to parts by weight and % by weight, respectively.

Each of aqueous emulsions according to Examples was prepared from (A) a monomer emulsion (i.e., copolymer A) and (B) a monomer emulsion (i.e., copolymer B). Polymerizable unsaturated monomers, surfactants and respective additives for the production of (A) and (B) are mentioned below.

Tg of homopolymer of the polymerizable unsaturated monomer is the literature value mentioned above, and Tg of the copolymer of the polymerizable unsaturated monomer (a) and Tg of the copolymer of the polymerizable unsaturated monomer (b) are the values calculated by the previously mentioned theoretical formula.

<Polymerizable Unsaturated Monomer>

Methyl methacrylate (methyl methacrylate, hereinafter referred to as "MMA" (manufactured by FUJIFILM Wako Pure Chemical Corporation, Tg of homopolymer is 105 degree C.)

2-Ethylhexyl acrylate (2-ethylhexyl acrylate, hereinafter referred to as "2EHA", manufactured by FUJIFILM Wako Pure Chemical Corporation, Tg of homopolymer is −70 degree C.)

n-Butyl acrylate (n-butyl acrylate, hereinafter referred to as "n-BA" manufactured by FUJIFILM Wako Pure Chemical Corporation, Tg of homopolymer is −54 degree C.)

n-Butyl methacrylate (n-butyl methacrylate, hereinafter referred to as "n-BMA", manufactured by FUJIFILM Wako Pure Chemical Corporation, Tg of homopolymer is 20 degree C.)

Cyclohexyl methacrylate (cyclohexylmethacrylate, hereinafter referred to as "CHMA", manufactured by FUJIFILM Wako Pure Chemical Corporation, Tg of homopolymer is 83 degree C.)

3-Methacryloxypropyltrimethoxysilane (manufactured by FUJIFILM Wako Pure Chemical Corporation)

Acrylic acid (hereinafter referred to as "AA", manufactured by FUJIFILM Wako Pure Chemical Corporation, Tg of homopolymer is 106 degree C.)

Styrene (hereinafter referred to as "St", manufactured by FUJIFILM Wako Pure Chemical Corporation, Tg of homopolymer is 100 degree C.)

<Surfactant>

Polyoxyethylene-1-(allyloxymethyl)alkyl ether sulfate ester ammonium salt (Aqualon KH10, manufactured by Dai-ichi Kogyo Seiyaku Co., Ltd., hereinafter referred to as "b")

Production Example 1

A monomer emulsion was prepared from a plurality of polymerizable unsaturated monomers, and then a pre-emulsion was prepared from the monomer emulsion and an aqueous resin emulsion was synthesized from the pre-emulsion. Specific processes are as follows.

(Preparation of (A) Monomer Emulsion)

As shown in Table 1, 5 parts by weight of (a1-1) MMA, 23 parts by weight of (a1-3) BA, 10 parts by weight of (a1-4) BMA, 10 parts by weight of (a1-5) CHMA, 2 parts by weight of (a3) AA, and 0.3 part by weight of (a2) 3-methacryloxypropyltrimethoxysilane were uniformly mixed to prepare a polymerizable unsaturated monomer solution (50.3 parts by weight).

To a solution prepared by uniformly mixing 14 parts by weight of water and 0.1 part by weight of (b) a polyoxyethylene-1-(allyloxymethyl)alkyl ether sulfate ester ammonium salt, the above polymerizable unsaturated monomer solution was added, and then the mixed solution was stirred by a stirrer to obtain (A) monomer emulsion.

(Preparation of (B) Monomer Emulsion)

As shown in Table 1, 16.6 parts by weight of (a1-1) MMA, 13 parts by weight of (a1-3) BA, 10 parts by weight of (a1-4) BMA, 10 parts by weight of (a1-5) CHMA, and 0.1 part by weight of (a2) 3-methacryloxypropyltrimethoxysilane were uniformly mixed to prepare a polymerizable unsaturated monomer solution.

To a solution prepared by uniformly mixing 14 parts by weight of water and 0.1 part by weight of (b) a polyoxyethylene-1-(allyloxymethyl)alkyl ether sulfate ester ammonium salt, the above polymerizable unsaturated monomer solution was added, and then the mixed solution was stirred by a stirrer to obtain (B) monomer emulsion.

(Synthesis Pre-Emulsion)

In a reactor equipped with a stirrer, a capacitor and a thermometer, 78 parts by weight of water and 1.25 parts by weight of (b) a polyoxyethylene-1-(allyloxymethyl)alkyl ether sulfate ester ammonium salt were charged, and after replacing inside the system with nitrogen gas, the charge solution was heated to 80 degree C.

Subsequently, to the charge solution, the monomer emulsion (A) (which is a portion corresponding to 10.1 parts by weight of the polymerizable unsaturated monomer (a), while whole of the monomer emulsion (A) containing 50.3 parts by weight of the polymerizable unsaturated monomer) and 2 parts by weight of an aqueous 1% by weight sodium persulfate (hereinafter also referred to as "SPS") solution were added.

After additional 10 minutes, while maintaining the temperature in the reactor at 80 degree C., the remainder of the monomer emulsion (A) (which is a portion corresponding to 40.2 parts by weight of the polymerizable unsaturated monomer (a)) and 4 parts by weight of an aqueous 1% solution of SPS, which is a polymerization catalyst, were simultaneously added dropwise over 2 hours to obtain a pre-emulsion (aqueous resin emulsionbased onthe polymerizable unsaturated monomer (a)).

(Synthesis of Aqueous Resin Emulsion)

The temperature in the reactor at 80 degree C. for 30 minutes after completion of the dropwise addition, and then the above monomer emulsion (B) (containing 49.7 parts by weight of the unsaturated polymeric monomer) and 4 parts by weight of an aqueous 1% solution of SPS were simultaneously added dropwise over 2 hours respectively to obtain an aqueous resin emulsion.

The pH of the aqueous resin emulsion thus obtained was adjusted to 8.0 with ammonia water. With respect to the aqueous resin emulsion, the copolymer of the polymerizable unsaturated monomer (A) (i.e., copolymer A) had a glass transition temperature of −3.8 degree C., the copolymer of the polymerizable unsaturated monomer (B) (i.e., copolymer B) had a glass transition temperature of 26.7 degree C., and the aqueous resin emulsion had a solid concentration of 45% by weight. The solid content is the weight percentage of the remaining portion of the aqueous resin emulsion after drying in an oven at 105 degree C. for 3 hours relative to the weight of the aqueous resin emulsion before drying.

The obtained aqueous resin emulsion is referred to as "silane-modified acrylic resin 1".

Production Examples 2 to 5

Using the raw material monomers shown in Table 1, the same synthesis was carried out in the same manner as in Production Example 1. The numbers related to the formulation in the table represent parts by weight. The obtained aqueous resin emulsions are referred to as silane-modified acrylic resins 2 to 5, respectively.

TABLE 1

| | Production Examples | | | | |
|---|---|---|---|---|---|
| | 1 | 2 | 3 | 4 | 5 |
| Copolymer A | | | | | |
| (a1) MMA | 5 | 18 | 21 | 15 | 15 |
| (a1) 2EHA | — | 20 | 22 | 23.6 | — |
| (a1) BA | 23 | — | — | — | 18 |
| (a1) BMA | 10 | 5 | — | 5 | 5 |
| (a1) CHMA | 10 | 5 | — | 5 | 10 |

TABLE 1-continued

|  | \multicolumn{5}{c}{Production Examples} |  |  |  |  |
|---|---|---|---|---|---|
|  | 1 | 2 | 3 | 4 | 5 |
| (a2) 3-methacryloxypropyl-trimethoxysilane | 0.3 | 0.5 | 0.15 | 0.3 | 0.1 |
| (a3) AA | 2 | 2 | 2 | 2 | 2 |
| St | — | — | 5 | — | — |
| Total amount of polymerizable unsaturated monomer | 50.3 | 50.5 | 50.15 | 50.9 | 50.1 |
| Glass transition temperature (Tg, degree C.) of copolymer of polymerizable unsaturated monomer | −3.8 | 0.93 | 0.8 | −9.9 | 17 |
| (b) polyoxyethylene-1-(allyloxymethyl)alkyl ether sulfate ester ammonium salt | 0.1 | 0.1 | 0.9 | 0.13 | 0.1 |
| Copolymer B |  |  |  |  |  |
| (a1) MMA | 16.6 | 22 | 33.7 | 23.7 | 16.8 |
| (a1) 2EHA | — | 12.2 | 11 | — | — |
| (a1) BA | 13 | — | — | 15.3 | 18 |
| (a1) BMA | 10 | 10 | — | 5 | 5 |
| (a1) CHMA | 10 | 5 | — | 5 | 10 |
| (a2) 3-methacryloxypropyl-trimethoxysilane | 0.1 | 0.3 | 0.15 | 0.1 | 0.1 |
| St | — | — | 5 | — | — |
| Total amount of polymerizable unsaturated monomer | 49.7 | 49.5 | 49.85 | 49.1 | 49.9 |
| Glass transition temperature (Tg, degree C.) of copolymer of polymerizable unsaturated monomer | 26.7 | 22.5 | 44.1 | 26.4 | 16.9 |
| (b) polyoxyethylene-1-(allyloxymethyl)alkyl ether sulfate ester ammonium salt | 0.1 | 0.1 | 0.9 | 0.13 | 0.1 |
| in reactor |  |  |  |  |  |
| (b) polyoxyethylene-1-(allyloxymethyl)alkyl ether sulfate ester ammonium salt | 1.25 | 1.25 | 0.2 | 1.25 | 1.8 |

Undercoat layer coating solution was prepared by dispersing and stirring the following formulation:

Undercoat Layer Coating Solution

| Calcined kaolin (BASF Co.: Ansilex 90) | 100.0 parts |
|---|---|
| Styrene-butadiene copolymer latex (Zeon Corporation, ST5526, solid content: 48%) | 10.0 parts |
| Water | 50.0 parts |

Color developing agent dispersions (Solutions A1 to A3), a leuco dye dispersion (Solution B) and a sensitizer dispersion (Solution C) with the following formulations were separately wet ground using sand grinders until the average particle sizes were about 0.5 μm.

Color Developing Agent Dispersion (Solution A1)

| 4-Hydroxy-4'-isopropoxydiphenylsulfon (Mitsubishi Chemical Corporation, NYDS) | 6.0 parts |
|---|---|
| Aqueous solution of completely saponified polyvinyl alcohol (Kuraray Co., Ltd., PVA117, solid content: 10%) | 5.0 parts |
| Water | 1.5 parts |

Color Developing Agent Dispersion (SolutionA2)

| N,N'-di-[3-(p-toluenesulfonyloxy) phenyl] urea | 6.0 parts |
|---|---|
| Aqueous solution of completely saponified polyvinyl alcohol (PVA117) | 5.0 parts |
| Water | 1.5 parts |

Color Developing Agent Dispersion (Solution A3)

| Phenol compound represented by the formula 4 (Nippon Soda Co., Ltd., D90) | 6.0 parts |
|---|---|
| Aqueous solution of completely saponified polyvinyl alcohol (PVA117) | 5.0 parts |
| Water | 1.5 parts |

[Formula 3]

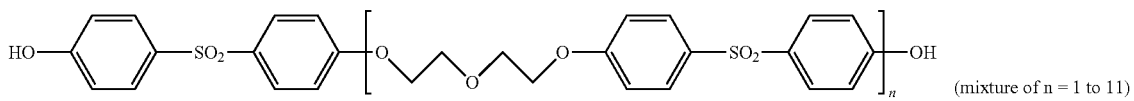

(mixture of n = 1 to 11)

Leuco Dye Dispersion (Solution B)

| 3-Dibutylamino-6-methyl-7-anilinofluorane (Yamamoto Chemicals Inc. ODB-2) | 6.0 parts |
|---|---|
| Aqueous solution of completely saponified polyvinyl alcohol (PVA117) | 5.0 parts |
| Water | 1.5 parts |

Sensitizer Dispersion (Solution C)

| 1,2-bis(3-Methylphenoxy) ethane (Sanko Co. Ltd, KS232) | 6.0 parts |
|---|---|
| Aqueous solution of completely saponified polyvinyl alcohol (PVA117) | 5.0 parts |
| Water | 1.5 parts |

Next, these dispersions were blended in the proportion described below to prepare the thermosensitive recording layer coating solution.

Thermosensitive Recording Layer Coating Solution 1

| | |
|---|---|
| Color developing agent dispersion (Solution A1) | 36.0 parts |
| Leuco dye dispersion (Solution B) | 18.0 parts |
| Sensitizer dispersion (Solution C) | 9.0 parts |
| Aqueous solution of completely saponified polyvinyl alcohol (PVA117) | 25.0 parts |

Thermosensitive Recording Layer Coating Solution 2

| | |
|---|---|
| Color developing agent dispersion (Solution A1) | 36.0 parts |
| Leuco dye dispersion (Solution B) | 18.0 parts |
| Sensitizer dispersion (Solution C) | 9.0 parts |
| Aqueous solution of completely saponified polyvinyl alcohol (PVA117) | 25.0 parts |
| Carbodiimide compound (Nisshinbo Chemical Inc. Carbodilite SV-02, solid content: 40%) | 0.2 parts |

Thermosensitive Recording Layer Coating Solution 3

| | |
|---|---|
| Color developing agent dispersion (Solution A1) | 36.0 parts |
| Leuco dye dispersion (Solution B) | 18.0 parts |
| Sensitizer dispersion (Solution C) | 9.0 parts |
| Silane-modified acrylic resin 1 (core shell type, Tg: 18 degree C., MFT: 22 degree C., solid content: 40%, hereinafter referred to as "Acrylic resin A" or "A".) | 6.0 parts |
| Carbodiimide compound (Carbodilite SV-02) | 0.2 parts |

Thermosensitive Recording Layer Coating Solution 4

| | |
|---|---|
| Color developing agent dispersion (Solution A2) | 10.0 parts |
| Leuco dye dispersion (Solution B) | 5.0 parts |
| Sensitizer dispersion (Solution C) | 3.0 parts |
| Aqueous solution of completely saponified polyvinyl alcohol (PVA117) | 25.0 parts |

Next, protective layer coating solution was prepared by mixing the following formulations:

Protective Layer Coating Solution 1

| | |
|---|---|
| Aluminum hydroxide dispersion (Martinsberg: Martifin OL, solid content: 50%) | 9.0 parts |
| Silane-modified acrylic resin 1 (Acrylic resin A) | 10.0 parts |
| Zinc stearate dispersion (Chukyo Yushi Co., Ltd.: HydrinZ-7-30, solid content: 30%) | 2.0 parts |

Protective Layer Coating Solution 2

| | |
|---|---|
| Aluminum hydroxide dispersion (Martifin OL) | 9.0 parts |
| Aqueous solution of completely saponified polyvinyl alcohol (PVA117) | 40.0 parts |
| Zinc stearate dispersion (HydrinZ-7-30) | 2.0 parts |
| Glyoxal (Nippon Synthetic Chemical Industry Co., Ltd., solid content: 40%) | 3.0 parts |

Protective Layer Coating Solution 3

| | |
|---|---|
| Aluminum hydroxide dispersion (Martifin OL) | 9.0 parts |
| Acrylic resin A | 10.0 parts |
| Zinc stearate dispersion (HydrinZ-7-30) | 2.0 parts |
| Carbodiimide compound (Carbodilite SV-02) | 0.3 parts |

Protective Layer Coating Solution 4

| | |
|---|---|
| Aluminum hydroxide dispersion (Martifin OL) | 9.0 parts |
| Silane-modified acrylic resin 1 (Acrylic resin A) | 5.0 parts |
| High Tg acrylic resin (not silane-modified, not core shell type, Tg: 55 degree C., MFT 18 degree C., solid content: 18%, hereinafter referred to as "Acrylic resin E" or "E".) | 11.1 parts |
| Zinc stearate dispersion (HydrinZ-7-30) | 2.0 parts |
| Carbodiimide compound (Carbodilite SV-02) | 0.3 parts |

Example 1

The undercoat layer coating solution was applied on one side of a support (groundwood free paper with a basis weight of 47 g/m$^2$) by using a bent blade coater with a coating amount (in solid) of 10.0 g/m$^2$, and was dried to prepare an undercoated paper.

The thermosensitive recording layer coating solution 1 was applied on the undercoat layer of the undercoated paper by using a rod blade coater with a coating amount (in solid) of 6.0 g/m$^2$ and was dried to prepare a thermosensitive recording medium.

Then the protective layer coating solution 1 was applied on the thermosensitive recording layer of the thermosensitive recording layer coated paper by using curtain method with a coating amount (in solid) of 3.0 g/m$^2$ and was dried and super calendared so that the smoothness was 100-500 seconds to prepare a thermosensitive recording medium.

Example 2

The thermosensitive recording layer coating solution 3 was applied on on one side of a support (PET film with a basis weight of 50 g/m$^2$) by using a rod blade coater with a coating amount (in solid) of 6.0 g/m$^2$ and was dried to prepare a thermosensitive recording medium.

Then the protective layer coating solution 3 was applied on the thermosensitive recording layer of the thermosensitive recording layer coated paper by using a rod blade coater with a coating amount (in solid) of 3.0 g/m$^2$ and was dried and super calendared so that the smoothness was 100-500 seconds to prepare a thermosensitive recording medium.

Example 3

The undercoat layer coating solution was applied on one side of a support (groundwood free paper with a basis weight of 47 g/m$^2$) by using a bent blade coater with a coating amount (in solid) of 10.0 g/m$^2$, and was dried to prepare an undercoated paper.

The thermosensitive recording layer coating solution 3 was applied on the undercoat layer of the undercoated paper by using a rod blade coater with a coating amount (in solid) of 6.0 g/m$^2$ and was dried to prepare a thermosensitive recording medium.

Then the protective layer coating solution 3 was applied on the thermosensitive recording layer of the thermosensitive recording layer coated paper by using a rod blade coater with a coating amount (in solid) of 3.0 g/m² and was dried and super calendared so that the smoothness was 100-500 seconds to prepare a thermosensitive recording medium.

Example 4

A thermosensitive recording medium was prepared in the same manner as described in Example 2 using the thermosensitive recording layer coating solution 2 in place of the thermosensitive recording layer coating solution 3.

Example 5

The undercoat layer coating solution was applied on one side of a support (groundwood free paper with a basis weight of 47 g/m²) by using a bent blade coater with a coating amount (in solid) of 10.0 g/m², and was dried to prepare an undercoated paper.

The thermosensitive recording layer coating solution 1 was applied on the undercoat layer of the undercoated paper by using a rod blade coater with a coating amount (in solid) of 6.0 g/m² and was dried to prepare a thermosensitive recording medium.

Then the protective layer coating solution 4 was applied on the thermosensitive recording layer of the thermosensitive recording layer coated paper by using a rod blade coater with a coating amount (in solid) of 3.0 g/m² and was dried and super calendared so that the smoothness was 100-500 seconds to prepare a thermosensitive recording medium.

Example 6

A thermosensitive recording medium was prepared in the same manner as described in Example 5 using the protective layer coating solution 4 with the exception of changing the amount of the Acrylic resin A from 0.5 parts to 10.0 parts and not using Acrylic resin E.

Example 7

The undercoat layer coating solution was applied on one side of a support (groundwood free paper with a basis weight of 47 g/m²) by using a bent blade coater with a coating amount (in solid) of 10.0 g/m², and was dried to prepare an undercoated paper.

The thermosensitive recording layer coating solution 4 was applied on the undercoat layer of the undercoated paper by using a rod blade coater with a coating amount (in solid) of 6.0 g/m² and was dried to prepare a thermosensitive recording medium.

Then the protective layer coating solution 1 was applied on the thermosensitive recording layer of the thermosensitive recording layer coated paperby using curtain method with a coating amount (in solid) of 3.0 g/m² and was dried and super calendared so that the smoothness was 100-500 seconds to prepare a thermosensitive recording medium.

Example 8

A thermosensitive recording medium was prepared in the same manner as described in Example 7 using the thermosensitive recording layer coating solution 4 with the exception of changing N,N'-di-[3-(p-toluenesulfonyloxy)phenyl]urea in the solution A2 to N,N'-di-[3-(o-toluenesulfonyloxy)phenyl]urea.

Example 9

A thermosensitive recording medium was prepared in the same manner as described in Example 7 using the thermosensitive recording layer coating solution 4 with the exception of changing N,N'-di-[3-(p-toluene sulfonyloxy)phenyl]urea in the solution A2 to N,N'-di-[3-(benzenesulfonyloxy)phenyl]urea.

Example 10

A thermosensitive recording medium was prepared in the same manner as described in Example 7 using the thermosensitive recording layer coating solution 4 with the exception of changing N,N'-di-[3-(p-toluene sulfonyloxy)phenyl]urea in the solution A2 to N,N'-di-[3-(mesitylenesulfonyloxy)phenyl]urea.

Example 11

A thermosensitive recording medium was prepared in the same manner as described in Example 7 using the thermosensitive recording layer coating solution 4 with the exception of changing N,N'-di-[3-(p-toluene sulfonyloxy)phenyl]urea in the solution A2 to N,N'-di-[3-(naphthalenesulfonyloxy)phenyl]urea.

Example 12

A thermosensitive recording medium was prepared in the same manner as described in Example 7 using the thermosensitive recording layer coating solution 4 with the exception of changing N,N'-di-[3-(p-toluene sulfonyloxy)phenyl]urea in the solution A2 to N,N'-di-[3-(p-methoxybenzenesulfonyloxy)phenyl]urea.

Example 13

A thermosensitive recording medium was prepared in the same manner as described in Example 7 using the thermosensitive recording layer coating solution 4 with the exception of changing N,N'-di-[3-(p-toluene sulfonyloxy)phenyl]urea in the solution A2 to N,N'-di-[3-(benzilsulfonyloxy)phenyl]urea.

Example 14

A thermosensitive recording medium was prepared in the same manner as described in Example 7 using the thermosensitive recording layer coating solution 4 with the exception of changing N,N'-di-[3-(p-toluene sulfonyloxy)phenyl]urea in the solution A2 to N,N'-di-[3-(ethanesulfonyloxy)phenyl]urea.

Example 15

A thermosensitive recording medium was prepared in the same manner as described in Example 7 using the thermosensitive recording layer coating solution 4 with the exception of changing N,N'-di-[3-(p-toluene sulfonyloxy)phenyl]urea in the solution A2 to N,N'-di-[4-(p-toluenesulfonyloxy)phenyl]urea.

Example 16

A thermosensitive recording medium was prepared in the same manner as described in Example 7 using the thermosensitive recording layer coating solution 4 with the exception of changing N,N'-di-[3-(p-toluene sulfonyloxy)phenyl] urea in the solution A2 to N,N'-di-[4-(benzenesulfonyloxy) phenyl]urea.

Example 17

A thermosensitive recording medium was prepared in the same manner as described in Example 7 using the thermosensitive recording layer coating solution 4 with the exception of changing the solution A2 to the solution A3.

Comparative Example 1

A thermosensitive recording medium was prepared in the same manner as described in Example 1 using the protective layer coating solution 1 with the exception of changing the silane-modified acrylic resin 1 (Acrylic resin A) to Acrylic resin B (not silane-modified, not core shell type, styrene-acrylic type, Tg: 2 degree C., MFT: 10 degree C., solid content: 40%).

Comparative Example 2

A thermosensitive recording medium was prepared in the same manner as described in Example 1 using the protective layer coating solution 1 with the exception of changing the Acrylic resin A to Acrylic resin C (not silane-modified, core shell type, styrene-acrylic type, Tg: 92 degree C., MFT: 50 degree C., solid content: 40%).

Comparative Example 3

A thermosensitive recording medium was prepared in the same manner as described in Example 1 using the protective layer coating solution 1 with the exception of using 22.2 parts of Acrylic resin D (not silane-modified, not core shell type, styrene-acrylic type, Tg: 55 degree C., MFT: 18 degree C., solid content: 18%) in place of 10 parts of Acrylic resin A.

Comparative Example 4

A thermosensitive recording medium was prepared in the same manner as described in Example 1 using the protective layer coating solution 2 in place of the protective layer coating solution 1.

The prepared thermosensitive recording media were evaluated as below.

<Color Developing Property (Recorded Density)>

A checkerboard pattern was printed on the prepared thermosensitive recording media by using a thermosensitive recording medium print tester (Ohkura Engineering Co., Ltd. TH-PMD equipped with a thermal head by Kyocera Co.) at applied energy of 0.35 mJ/dot and 0.41 mJ/dot and printing speed of 50 mm/sec. The density of the printed portion was measured by using Macbeth Densitometer (RD-914, with Amber filter) to evaluate the color developing property (recorded density).

<High-Speed Printability>

A barcode (CODE39) is printed on the prepared thermosensitive recording media by using a label printer 140XiIII manufactured by Zebra at the printing level of +10 and the printing speed of 25.4 cm/sec (10 inches/sec) in the vertical direction (i.e., so that the moving direction of the printer head and the barcode are orthogonal to each other.).

Then, the printed barcode is read by a barcode verification machine (Honeywell, QCPC600, light source 640 nm) to evaluate the barcode reading suitability. The evaluation results are shown in the ANSI standard symbol grade.

Symbol grade: The barcode is divided into 10 parts in the direction perpendicular to the bar, and a reading test is performed once at each location, and the average value is represented by a 5-point scale of (excellent) A, B, C, D and F (poor).

<Ink Fixability>

The thermosensitive recording surface of the prepared thermosensitive recording medium is printed with a Roland offset sheet-fed printing press (2 colors) using offset sheet-fed ink (T & K UV161 black ink), and then UV ink curing treatment is performed with a UV irradiator (I Graphics, Eye Grandage).

Then, a cellophane tape with a width of 18 mm is attached to the printed surface, and pressed by reciprocating a roller (diameter 10 cm, width 13 cm, weight 2000 g) on the cellophane tape 5 times, and then the cellophane tape is pulled using a digital force gauge (Nidec Symposium, FGX-2) at a tensile force of 4.9 N and a tensile angle of 90 degree, and the fixability of the ink is visually evaluated according to the following criteria.

Good: almost no ink comes off

Fair: ink peels off slightly

Poor: most of the ink comes off

<Solvent Barrier Property>

Ethanol (99.5%) is applied on the blank portion of the prepared thermosensitive recording medium with a cotton swab, which is then allowed to stand for 24 hours under 23 degree C.×50% RH environmental conditions, and then visually evaluated according to the following criteria.

Good: No color development at all

Fair: Slight color development

Poor: Strong color development

<Wet Friction>

The surface of the protective layer of the prepared thermosensitive recording medium is rubbed 80 times back and forth with a finger of a tester, which is wetted by tap water. Then the thermosensitive recording medium is visually evaluated if there's peeling observed on the protective layer and the thermosensitive recording layer according to the following criteria.

Good: No peeling observed in the protective layer and the thermosensitive recording layer Fair: The protective layer is slightly peeled off, while the thermosensitive recording layer is not peeled off.

Poor: Both the protective layer and thermosensitive recording layer are peeled off <Water Blocking Resistance>

10 ml of tap water is dropped on the surface of the protective layer of the prepared thermosensitive recording medium, which is then folded in half so that the surface of the protective layer is inside. After a load of 20 gf/cm2 is applied on this for 24 hours, the folded thermosensitive recording medium is opened.

Then the portion of the thermosensitive recording medium on which tap water is dropped is visually evaluated if there's peeling observed on the protective layer and the thermosensitive recording layer according to the following criteria.

Good: No blocking occurs and no peeling observed on the protective layer and the thermosensitive recording layer Possible: Blocking occurs and the protective layer peels off slightly, while the thermosensitive recording layer causes no peel off.

Poor: Strong blocking occurs and the protective layer and the thermosensitive recording layer are peeled off, or the thermosensitive recording medium is destroyed when opened.

<Immersion Friction>

The prepared thermosensitive recording medium is immersed in tap water for 10 minutes, then the surface of the protective layer of the thermosensitive recording medium is rubbed 20 times back and forth with a finger of a tester. Then the thermosensitive recording medium is visually evaluated if there's peeling observed on the protective layer and the thermosensitive recording layer according to the following criteria.

Good: No peeling observed in the protective layer and the thermosensitive recording layer Fair: The protective layer is slightly peeled off, while the thermosensitive recording layer is not peeled off.

Poor: Both the protective layer and thermosensitive recording layer are peeled off <Water Whitening Resistance>

The prepared thermosensitive recording medium was recorded solidly by a label printer 140XiIII manufactured by Zebra at the printing level of +10 and the printing speed of 102 mm/sec (4 inches/sec), which is then immersed in tap water for 24 hours. After taking out from tap water, the thermosensitive recording medium is naturally dried, and the condition of the solid printed portion was visually evaluated according to the following criteria.

Good: Almost no change in the density of the solid recorded area.

Fair: The coated layer causes slight whiting and the density of the solid recorded area fades, while no problem for practical use.

Poor: The coated layer causes significant whitening and cracks also occur.

<Heat Fracture Resistance>

The prepared thermosensitive recording medium was recorded solidly by a label printer 140XiIII manufactured by Zebra at the printing level of +10 and the printing speed of 50 mm/sec (2 inches/sec). To evaluate the heat resistance of the coated layer against excessive heat energy from the printer, the condition of the solid recorded area is visually evaluated according to the following criteria.

Good: Solidly printed area is uniform

Fair: Some unevenness observed on the solidly printed area

Poor: Significant unevenness observed on the solidly printed area

<Plasticizer Resistance>

A checkerboard pattern was printed on the prepared thermosensitive recording media by using a thermosensitive recording medium print tester (Ohkura Engineering Co., Ltd. TH-PMD equipped with a thermal head by Kyocera Co.) at applied energy of 0.41 mJ/dot and printing speed of 50 mm/sec. A paper tube was wrapped once with polyvinyl chloride wrap (Mitsui Toatsu Chemical: High Wrap KMA) and the recorded thermosensitive recording medium was applied on the wrapped paper tube. Furthermore, the tube was wrapped 3 times with polyvinyl chloride wrap and was left standing for 24 hours at 40 degree C. The density of the printed portion was measured by using Macbeth Densitometer (RD-914, withAmber filter).

<PVC Sticking Resistance>

A checkerboard pattern was printed on the prepared thermosensitive recording media by using a thermosensitive recording medium print tester (Ohkura Engineering Co., Ltd. TH-PMD equipped with a thermal head by Kyocera Co.) at applied energy of 0.41 mJ/dot and printing speed of 50 mm/sec. PVC wrap (Mitsui Toatsu Chemical: High Wrap KMA) was placed on the printed thermosensitive recording medium, and a load of 20 gf/cm$^2$ is applied on this for 24 hours at 40 degree C. Then the PVC wrap is peeled off, and the stickiness of the protective layer to the PVC wrap is visually evaluated according to the following criteria.

Good: No sticking observed, PVC wrap can be easily peeled off

Fair: PVC wrap and protective layer stick together, while no change in the printed checkered pattern.

Poor: PVC wrap and the protective layer stick strongly, and the printed checkered pattern is transferred to the PVC wrap.

<Oil Resistance>

A checkerboard pattern was printed on the prepared thermosensitive recording media by using a thermosensitive recording medium print tester (Ohkura Engineering Co., Ltd. TH-PMD equipped with a thermal head by Kyocera Co.) at applied energy of 0.41 mJ/dot and printing speed of 50 mm/sec. Then salad oil was applied on the printed thermosensitive recording media with a cotton swab, which was left for 24 hours. Then the density of the printed portion was measured by using Macbeth Densitometer (RD-914, with Amber filter). The oil resistance was evaluated according to the following criteria:

Good: The residual rate is 90% or higher

Fair: The residual rate is 70% or higher and less than 90%

Poor: The residual rate is less than 70%

<Heat Resistance>

The printed surface of the prepared thermosensitive recording medium was contacted with an iron plate heated at 110 degree C. for 5 seconds. The color density of non-printed portion (i.e. blank portion) was measured by using Macbeth Densitometer (RD-914, with Amber filter) and the background color value was calculated from the difference between the color densities before and after the treatment. The heat discoloration resistance in the blank portion was evaluated on the following criteria.

Background color value=(color density of the non-printing portion after the treatment)−(color density of the non-printing portion before the treatment)

Good: The background color value is less than 0.1

Fair: The background color value is 0.1 or higher and less than 0.2

Poor: The background color value is 0.2 or higher

The evaluation results are shown in following Tables.

TABLE 2

|  |  | Example 1 | Comparative Example 1 | Comparative Example 2 | Comparative Example 3 | Comparative Example 4 |
|---|---|---|---|---|---|---|
| Binder contained in protective layer | Acrylic resin | A | — | — | — | — |
|  |  | — | B | — | — | — |
|  |  | — | — | C | — | — |
|  |  | — | — | — | D | — |
|  | PVA | — | — | — | — | PVA117 |

TABLE 2-continued

|  |  | Example 1 | Comparative Example 1 | Comparative Example 2 | Comparative Example 3 | Comparative Example 4 |
|---|---|---|---|---|---|---|
| Color developing property | 0.35 mJ/dot | 1.36 | 1.29 | 1.31 | 1.35 | 1.29 |
| (Recorded density) | 0.41 mJ/dot | 1.41 | 1.34 | 1.37 | 1.38 | 1.31 |
| High-speed printability |  | B 2.6 | C 2.0 | C 2.3 | B 2.6 | D 1.2 |
| Ink fixability |  | Good | Fair | Poor | Poor | Poor |
| Solvent barrier property |  | Good | Fair | Poor | Poor | Good |
| Water resistance | Wet friction | Good | Good | Good | Good | Poor |
|  | Water blocking resistance | Good | Fair | Fair | Good | Poor |
|  | Immersion friction | Good | Fair | Poor | Good | Poor |

TABLE 3

|  |  | Example 2 | Example 3 | Example 4 | Example 5 | Example 6 |
|---|---|---|---|---|---|---|
| Binder contained in thermosensitive recording layer | silane-modified acrylic resin | A | A | — | — | — |
|  | Others | — | — | PVA117 | — | — |
| Binder contained in protective layer | silane-modified acrylic resin | A | A | A | A | A |
|  | other acrylic resin | — | — | — | E | — |
| substrate |  | PET film | Groundwood free paper/ undercoat layer | PET film | Groundwood free paper/ undercoat layer | Groundwood free paper/ undercoat layer |
| Color developing property | 0.35 mJ/dot | 1.41 | 1.37 | 1.36 | 1.38 | 1.36 |
| (Recorded density) | 0.41 mJ/dot | 1.45 | 1.48 | 1.41 | 1.43 | 1.41 |
| High-speed printability |  | B 3.0 | B 2.9 | B 2.6 | B 2.9 | B 2.6 |
| Ink fixability |  | Good | Good | Good | Good | Good |
| Solvent barrier property |  | Good | Good | Good | Good | Good |
| Water resistance | Wet friction | Good | Good | Good | Good | Good |
|  | Water blocking resistance | Good | Fair | Good | Good | Good |
|  | Immersion friction | Good | Good | Good | Good | Good |
|  | Water whitening resistance | Good | Good | Poor | — | — |
| Heat fracture resistance |  | Good | Good | Fair | — | — |
| Plasticizer resistance |  | — | — | — | 1.33 | 0.94 |
| PVC sticking resistance |  | — | — | — | Good | Poor |

TABLE 4

|  |  | Example 7 | Example 8 | Example 9 | Example 10 | Example 11 | Example 12 |
|---|---|---|---|---|---|---|---|
| Color developing agent | N,N'-di- [3- (p-toluenesulfonyloxy) phenyl] urea | ○ | — | — | — | — | — |
|  | N,N'-di- [3- (o-toluenesulfonyloxy) phenyl] urea | — | ○ | — | — | — | — |
|  | N,N'-di- [3- (benzenesulfonyloxy) phenyl] urea | — | — | ○ | — | — | — |
|  | N,N'-di- [3- (mesitylene sulfonyloxy) phenyl] urea | — | — | — | ○ | — | — |
|  | N,N'-di- [3- (2-naphthalenesulfonyloxy) phenyl] urea | — | — | — | — | ○ | — |
|  | N,N'-di- [3- (p-methoxybenzenesulfonyloxy) phenyl] urea | — | — | — | — | — | ○ |
|  | N,N'-di- [3- (benzylsulfonyloxy) phenyl] urea | — | — | — | — | — | — |
|  | N,N'-di- [3- (ethanesulfonyloxy) phenyl] urea | — | — | — | — | — | — |
|  | N,N'-di- [4- (p-toluenesulfonyloxy) phenyl] urea | — | — | — | — | — | — |
|  | N,N'-di- [4- (benzenesulfonyloxy) phenyl] urea | — | — | — | — | — | — |
|  | D90 | — | — | — | — | — | — |
| Binder contained in protective layer | Silane-modified acrylic resin A | ○ | ○ | ○ | ○ | ○ | ○ |
|  | Others |  |  |  |  |  |  |
| Evaluation results | Color developing property (Recorded density) 0.41 mJ/dot | 1.34 | 1.27 | 1.33 | 1.31 | 1.33 | 1.34 |
|  | High-speed printability ANSI | B 2.6 | B 2.7 | B 2.5 | B 2.5 | B 2.6 | B 2.7 |
|  | Ink fixability | Good | Good | Good | Good | Good | Good |
|  | Solvent barrier property | Good | Good | Good | Good | Good | Good |
|  | Water resistance — Wet friction | Good | Good | Good | Good | Good | Good |
|  | Water resistance — Water blocking resistance | Good | Good | Good | Good | Good | Good |
|  | Water resistance — Immersion friction | Good | Good | Good | Good | Good | Good |
|  | Plasticizer resistance | Good | Good | Good | Good | Good | Good |
|  | Oil resistance | Good | Good | Good | Good | Good | Good |
|  | Heat resistance | Good | Fair | Good | Good | Good | Good |

TABLE 4-continued

|  |  | Example 13 | Example 14 | Example 15 | Example 16 | Example 17 |
|---|---|---|---|---|---|---|
| Color developping agent | N,N'-di-[3-(p-toluenesulfonyloxy) phenyl] urea | — | — | — | — | — |
|  | N,N'-di-[3-(o-toluenesulfonyloxy) phenyl] urea | — | — | — | — | — |
|  | N,N'-di-[3-(benzenesulfonyloxy) phenyl] urea | — | — | — | — | — |
|  | N,N'-di-[3-(mesitylene sulfonyloxy) phenyl] urea | — | — | — | — | — |
|  | N,N'-di-[3-(2-naphthalenesulfonyloxy) phenyl] urea | — | — | — | — | — |
|  | N,N'-di-[3-(p-methoxybenzenesulfonyloxy) phenyl] urea | — | — | — | — | — |
|  | N,N'-di-[3-(benzylsulfonyloxy) phenyl] urea | ○ | — | — | — | — |
|  | N,N'-di-[3-(ethanesulfonyloxy) phenyl] urea | — | ○ | — | — | — |
|  | N,N'-di-[4-(p-toluenesulfonyloxy) phenyl] urea | — | — | ○ | — | — |
|  | N,N'-di-[4-(benzenesulfonyloxy) phenyl] urea | — | — | — | ○ | — |
|  | D90 | — | — | — | — | ○ |
| Binder contained in protective layer | Silane-modified acrylic resin A | ○ | ○ | ○ | ○ | ○ |
|  | Others |  |  |  |  |  |
| Evaluation results | Color developing property (Recorded density) 0.41 mJ/dot | 1.32 | 1.33 | 1.31 | 1.32 | 1.2 |
|  | High-speed printability ANSI | B 2.5 | B 2.5 | B 2.7 | B 2.5 | B 2.6 |
|  | Ink fixability | Good | Good | Good | Good | Good |
|  | Solvent barrier property | Good | Good | Good | Good | Good |
| Water resistance | Wet friction | Good | Good | Good | Good | Good |
|  | Water blocking resistance | Good | Good | Good | Good | Good |
|  | Immersion friction | Good | Good | Good | Good | Good |
|  | Plasticizer resistance | Good | Good | Good | Good | Fair |
|  | Oil resistance | Good | Good | Good | Good | Fair |
|  | Heat resistance | Good | Good | Good | Good | Poor |

What is claimed is:

1. A thermosensitive recording medium having a thermosensitive recording layer comprising a colorless or pale colored electron donating leuco dye and an electron accepting color developing agent on a substrate and a protective layer on the thermosensitive recording layer, wherein the protective layer comprises a silane- modified acrylic resin and the silane-modified acrylic resin is an aqueous emulsion of core-shell type particles, wherein the core-shell type particle comprises (i) a core comprising copolymer A prepared by polymerizing the following (a1), (a2) and (a3) in the presence of (b), and (ii) a shell comprising copolymer B prepared by polymerizing the following (a1) and (a2) in the presence of (b).
   (a1) at least one (meth) acrylic acid ester
   (a2) a monomer having an alkoxysilyl group and an ethylenic double bond
   (a3) a monomer having a carboxyl group and an ethylenic double bond
   (b) a polymerizable surfactant comprising a sulfate having an allyl group and a polyoxyethylene chain.

2. The thermosensitive recording medium of claim 1, wherein the copolymer A is prepared by adding a styrene monomer to the (a1), (a2) and (a3) and polymerizing these in the presence of (b), and/or the copolymer B is prepared by adding a styrene monomer to the (a1) and (a2) and polymerizing these in the presence of (b).

3. The thermosensitive recording medium of claim 1, wherein
   (i) in the copolymer A, the amount of the a2 component is 0.05 to 1.0 weight % and the amount of the a3 component is 0.5 to 10 weight % with respect to the combined weight of the a1, a2 and a3 components, and
   (ii) in the copolymer B, the amount of the a2 component is 0.01 to 1.0 weight % with respect to the combined weight of the a1 and a2 components.

4. The thermosensitive recording medium of claim 1, wherein the total amount of the b component in the copolymers A and B is 0.5 to 5 weight % with respect to the combined weight of the a1, a2 and a3 components in the copolymers A and B.

5. The thermosensitive recording medium of claim 1, wherein the thermosensitive recording layer comprises the silane-modified acrylic resin defined above, provided that the silane-modified acrylic resin contained in the thermosensitive recording layer and the silane-modified acrylic resin contained in the protective layer may be different or the same.

6. The thermosensitive recording medium of claim 5, wherein the silane- modified acrylic resin contained in the thermosensitive recording layer and the silane-modified acrylic resin contained in the protective layer are the same.

7. The thermosensitive recording medium of claim 1, wherein the protective layer further comprises an acrylic resin with a glass transition temperature of higher than 50 degree C. and lower than or equal to 95 degree C.

8. The thermosensitive recording medium of claim 1, wherein the thermosensitive recording layer comprises an urea-based compound represented by the general formula 1 as the electron accepting color developing agent,

[Formula 1]

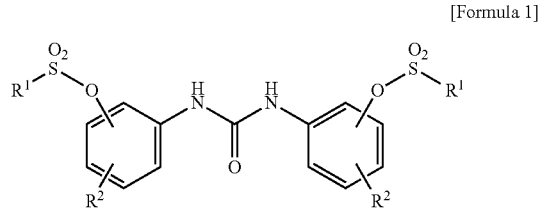

wherein $R^1$ represents a substituted or unsubstituted alkyl group, aralkyl group or aryl group, and $R^2$ represents a hydrogen atom or an alkyl group.

9. The thermosensitive recording medium of claim 8, wherein the urea-based compound is represented by the general formula 2,

[Formula 2]

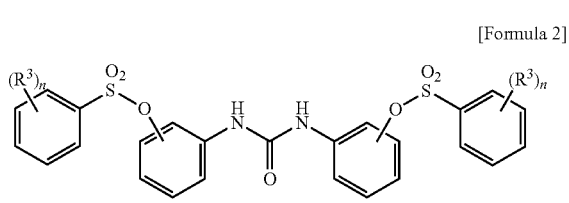

wherein $R^3$ represents an alkyl group or an alkoxy group, and n represents an integer of 0 to 3.

10. The thermosensitive recording medium of claim 9, wherein $R^3$ represents an alkyl group having 1 to 4 carbon atoms, n represents an integer of 0 to 1, and $R^3$ is at 4-position in the benzene ring.

11. The thermosensitive recording medium of claim 8, wherein the content (in solid) of the urea-based compound in the thermosensitive recording layer is from 1.0 to 50.0 weight %.

12. The thermosensitive recording medium of claim 2, wherein
   (i) in the copolymer A, the amount of the a2 component is 0.05 to 1.0 weight % and the amount of the a3 component is 0.5 to 10 weight % with respect to the combined weight of the a1, a2 and a3 components, and
   (ii) in the copolymer B, the amount of the a2 component is 0.01 to 1.0 weight % with respect to the combined weight of the a1 and a2 components.

13. The thermosensitive recording medium of claim 2, wherein the total amount of the b component in the copolymers A and B is 0.5 to 5 weight % with respect to the combined weight of the a1, a2 and a3 components in the copolymers A and B.

14. The thermosensitive recording medium of claim 2, wherein the thermosensitive recording layer comprises the silane-modified acrylic resin defined above, provided that the silane-modified acrylic resin contained in the thermosensitive recording layer and the silane-modified acrylic resin contained in the protective layer may be different or the same.

15. The thermosensitive recording medium of claim 2, wherein the protective layer further comprises an acrylic resin with a glass transition temperature of higher than 50 degree C. and lower than or equal to 95 degree C.

16. The thermosensitive recording medium of claim 2, wherein the thermosensitive recording layer comprises an urea-based compound represented by the general formula 1 as the electron accepting color developing agent,

[Formula 1]

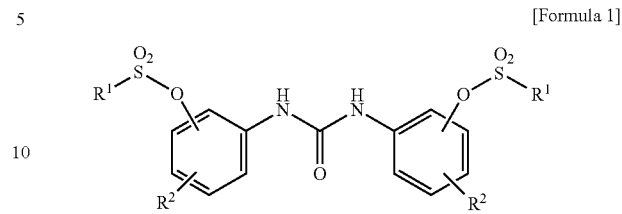

wherein $R^1$ represents a substituted or unsubstituted alkyl group, aralkyl group or aryl group, and $R^2$ represents a hydrogen atom or an alkyl group.

17. The thermosensitive recording medium of claim 3, wherein the total amount of the b component in the copolymers A and B is 0.5 to 5 weight % with respect to the combined weight of the a1, a2 and a3 components in the copolymers A and B.

18. The thermosensitive recording medium of claim 3, wherein the thermosensitive recording layer comprises the silane-modified acrylic resin defined above, provided that the silane-modified acrylic resin contained in the thermosensitive recording layer and the silane-modified acrylic resin contained in the protective layer may be different or the same.

19. The thermosensitive recording medium of claim 3, wherein the protective layer further comprises an acrylic resin with a glass transition temperature of higher than 50 degree C. and lower than or equal to 95 degree C.

20. The thermosensitive recording medium of claim 3, wherein the thermosensitive recording layer comprises an urea-based compound represented by the general formula 1 as the electron accepting color developing agent,

[Formula 1]

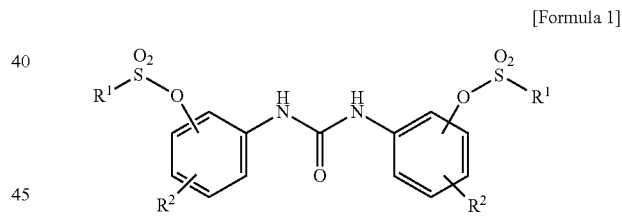

wherein $R^1$ represents a substituted or unsubstituted alkyl group, aralkyl group or aryl group, and $R^2$ represents a hydrogen atom or an alkyl group.

* * * * *